US008400994B2

(12) United States Patent
Noh et al.

(10) Patent No.: US 8,400,994 B2
(45) Date of Patent: Mar. 19, 2013

(54) METHOD FOR TRANSMITTING DOWNLINK REFERENCE SIGNALS IN A MULTI-ANTENNA WIRELESS COMMUNICATION SYSTEM

(75) Inventors: Yu Jin Noh, Anyang-si (KR); Ki Jun Kim, Anyang-si (KR); Byeong Woo Kang, Anyang-si (KR); Dae Won Lee, Anyang-si (KR); Bong Hoe Kim, Anyang-si (KR); Dong Wook Roh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 478 days.

(21) Appl. No.: 12/608,704

(22) Filed: Oct. 29, 2009

(65) Prior Publication Data

US 2010/0111065 A1     May 6, 2010

Related U.S. Application Data

(60) Provisional application No. 61/109,894, filed on Oct. 30, 2008, provisional application No. 61/173,210, filed on Apr. 28, 2009.

(30) Foreign Application Priority Data

Dec. 24, 2008   (KR) ........................ 10-2008-0132996
Sep. 10, 2009   (KR) ........................ 10-2009-0085402

(51) Int. Cl.
*H04B 7/216*     (2006.01)
(52) U.S. Cl. ......... 370/342; 370/329; 370/343; 370/345

(58) Field of Classification Search .................. 370/209, 370/312, 329, 336, 342
See application file for complete search history.

(56) References Cited

U.S. PATENT DOCUMENTS

| 2007/0104089 | A1* | 5/2007 | Mujtaba ........................ 370/209 |
| 2008/0225788 | A1* | 9/2008 | Inoue et al. .................... 370/329 |
| 2008/0260062 | A1 | 10/2008 | Imamura |
| 2009/0028264 | A1* | 1/2009 | Zhang et al. ................... 375/267 |
| 2009/0268695 | A1* | 10/2009 | Zhao et al. ..................... 370/336 |
| 2010/0034299 | A1* | 2/2010 | Love et al. ..................... 375/260 |
| 2010/0046412 | A1* | 2/2010 | Varadarajan et al. .......... 370/312 |

OTHER PUBLICATIONS

Samsung, "Reference Signal Structure for 4-TX Antenna MIMO", 3GPP TSG RAN WG1 Meeting #47, Doc. No. R1-063254, Nov. 30, 2006.
Sharp, "Proposal for 2-RS and 4-RS Structure Application in LTE Downlink", 3GPP TSG-RAN WG1#49, Doc. No. R1-072052, May 30, 2007.

* cited by examiner

*Primary Examiner* — Hassan Kizou
*Assistant Examiner* — Toan Nguyen
(74) *Attorney, Agent, or Firm* — Lee, Hong, Degerman, Kang & Waimey

(57) ABSTRACT

A method for transmitting downlink reference signal in a multi-antenna wireless communication system is disclosed. The method includes allocating RSs for a first antenna group to a subframe having a predetermined area with different access levels for user equipments having different access capabilities, pairing RSs for a second antenna group with RSs for the first antenna group, allocating the paired RSs to the predetermined area of the subframe in code division multiplexing, and transmitting the subframe on the downlink.

42 Claims, 24 Drawing Sheets (a) Normal CP    (b) Extended CP

FIG. 12
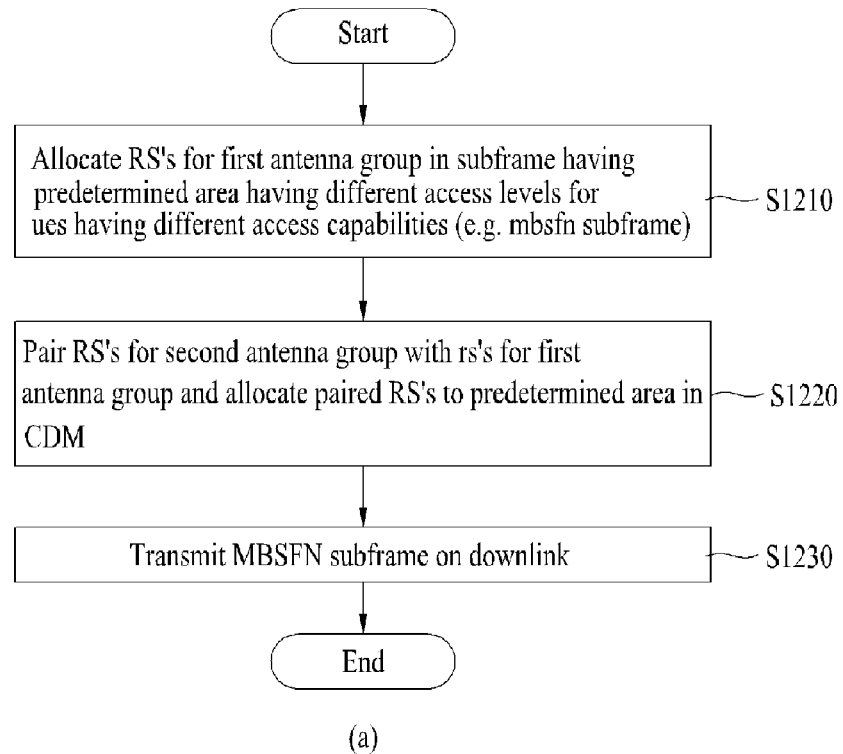
(a)
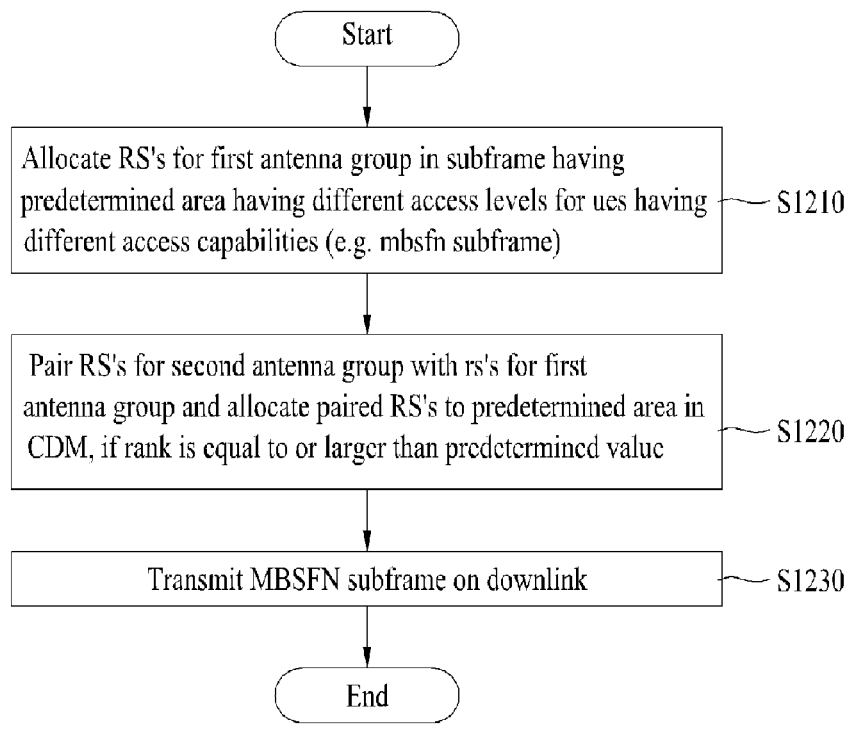
(b)

FIG. 14
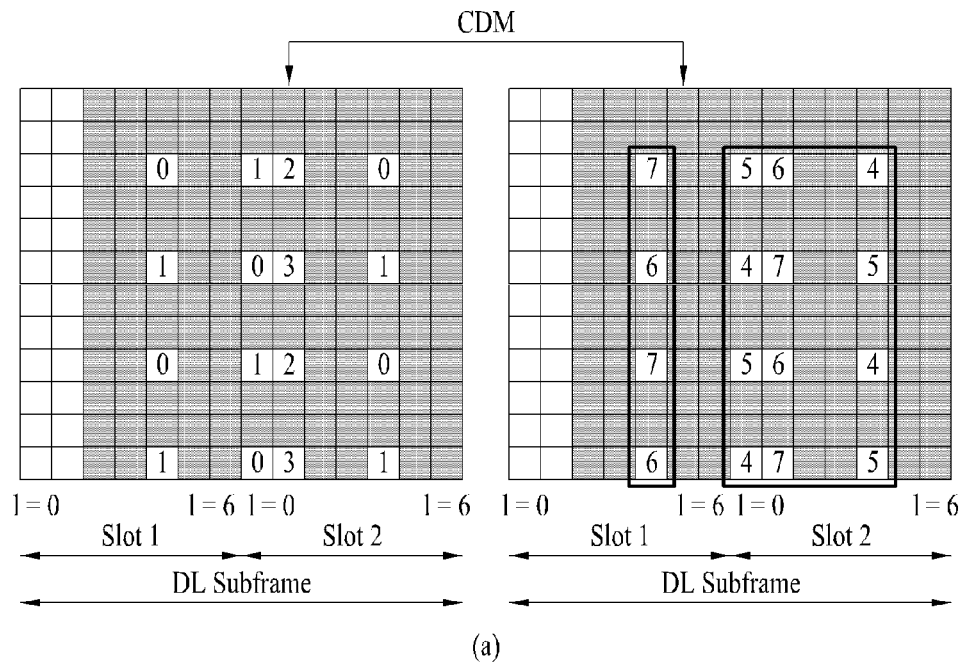
(a)
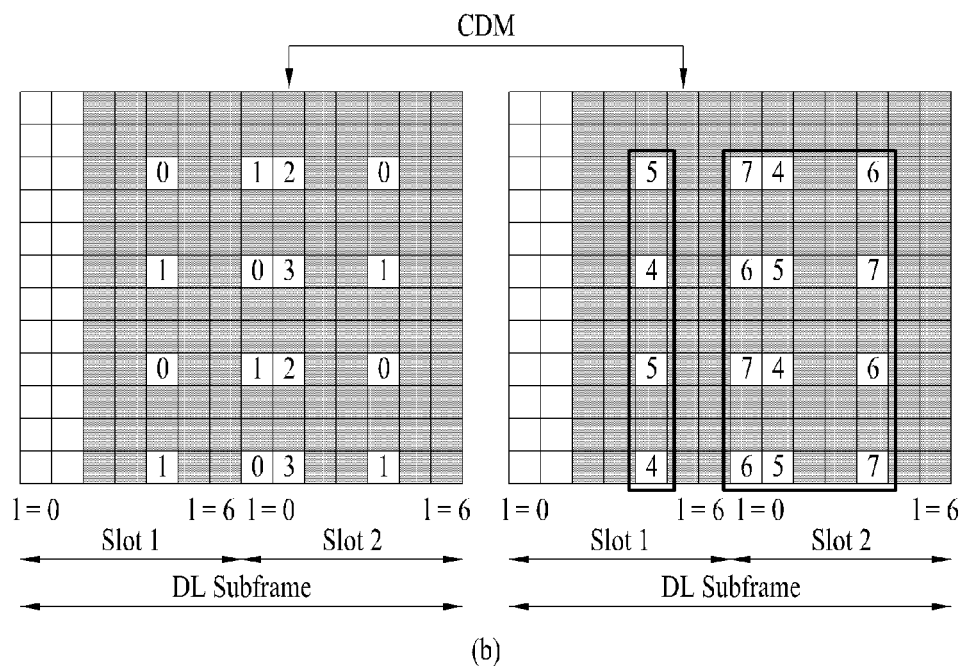
(b)

FIG. 15
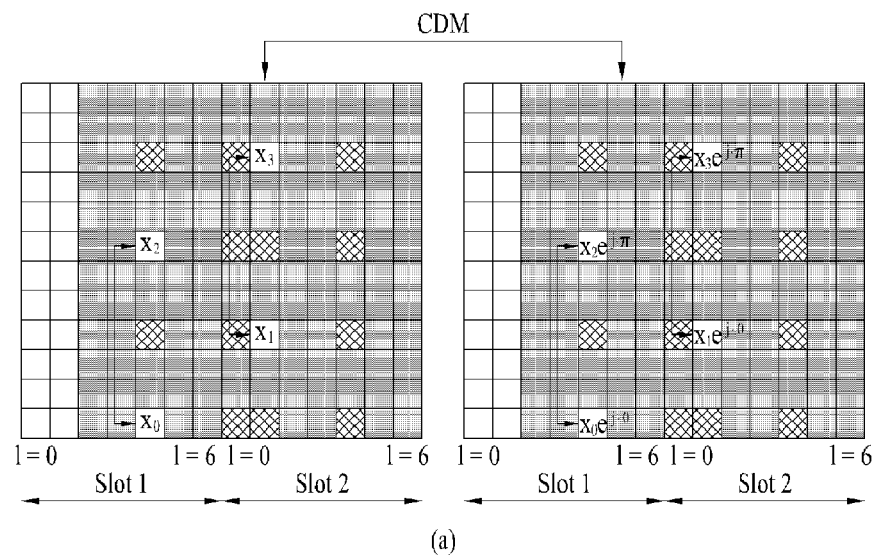
(a)
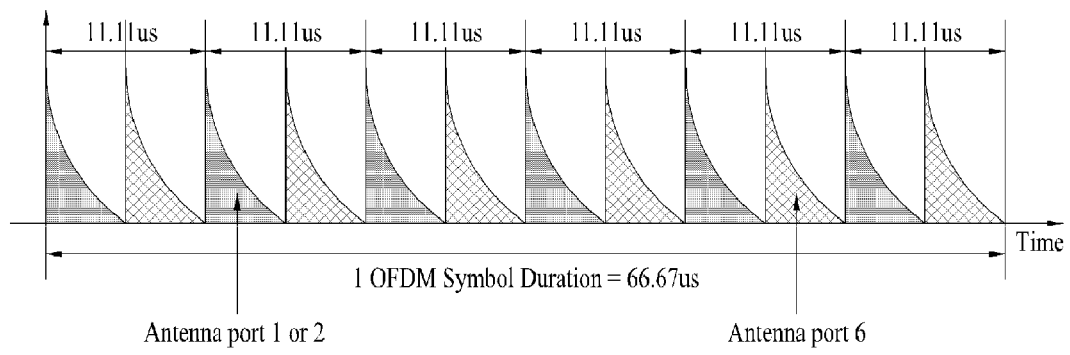
(b)

FIG. 18
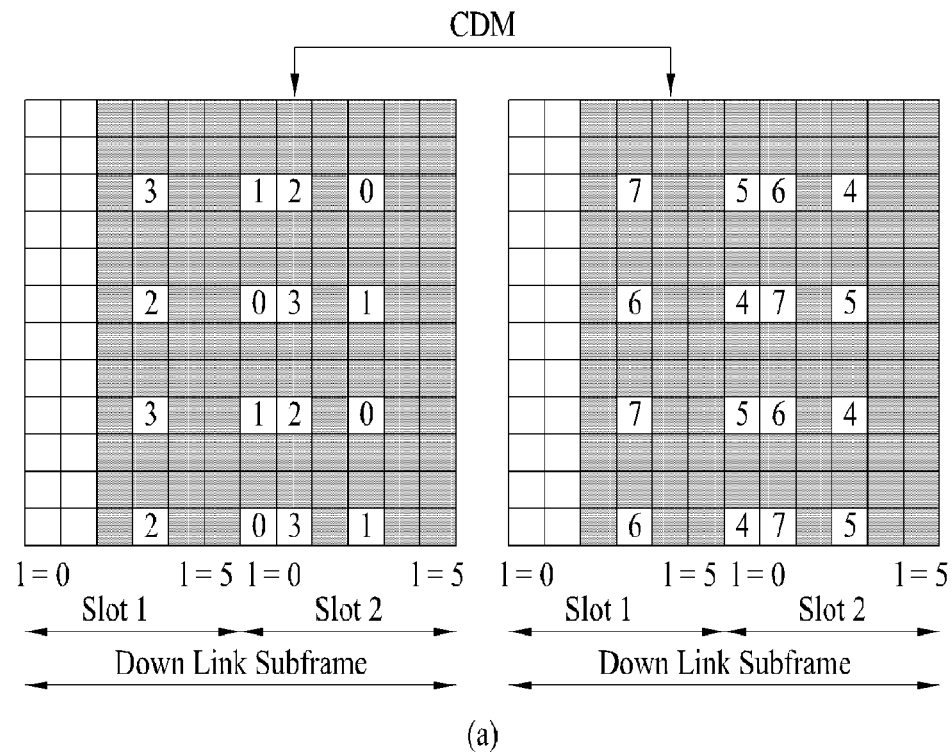
(a)
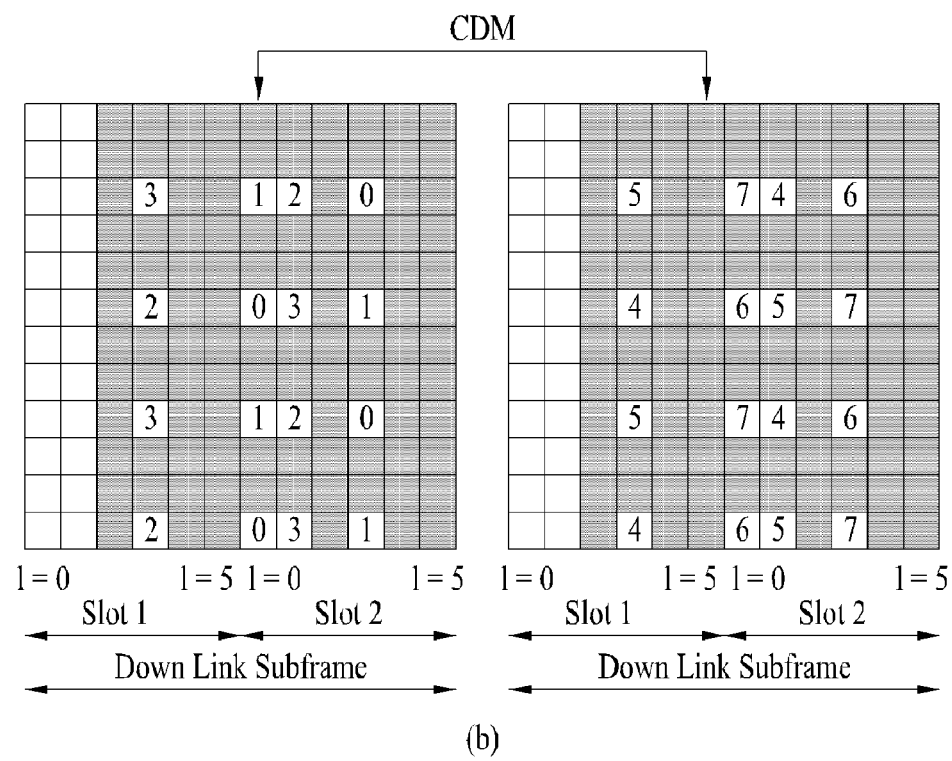
(b)

FIG. 19,
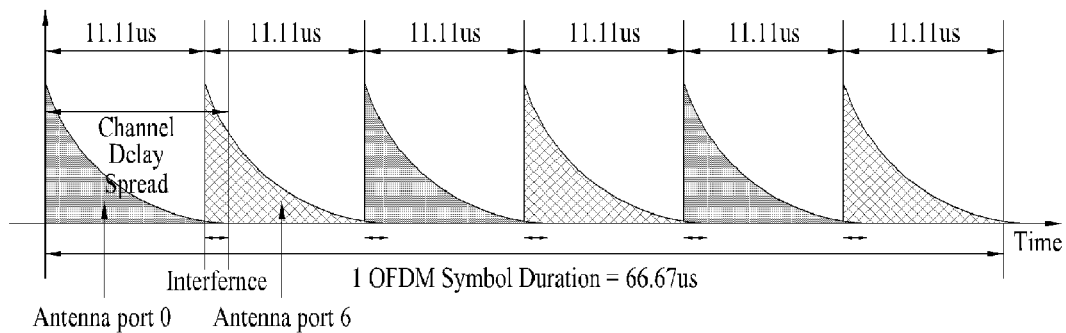
FIG. 20
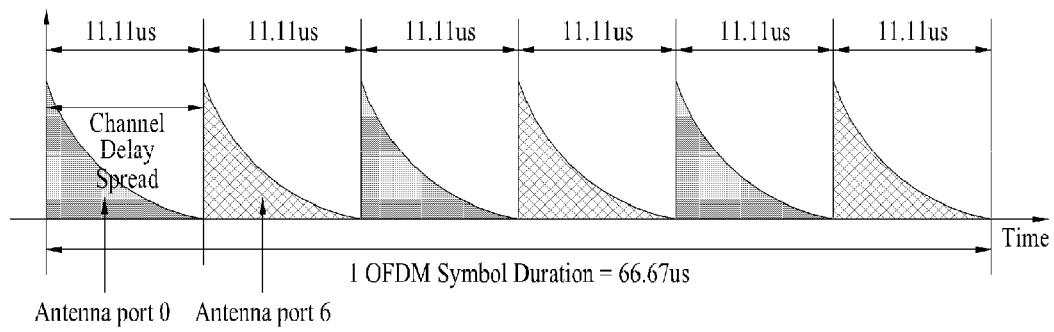

(a) Normal CP  (b) Extended CP

FIG. 32

| | | | | | | | | | D | |
|---|---|---|---|---|---|---|---|---|---|---|
| | | | | | | | | D | | |
| 1 | 3 | | 0 | D | | 1 | 2 | | 0 | |
| | | | | | | | | | D | |
| | | | | | | | | D | | |
| 0 | 2 | | 1 | D | | 0 | 3 | | 1 | |
| | | | | | | | | | D | |
| | | | | | | | | D | | |
| 1 | 3 | | 0 | D | | 1 | 2 | | 0 | |
| | | | | | | | | | D | |
| | | | | | | | | D | | |
| 0 | 2 | | 1 | D | | 0 | 3 | | 1 | | l = 0          l = 5 l = 0          l = 5

⟵——— Slot 1 ———⟶⟵——— Slot 2 ———⟶
⟵————————— DownLink Subframe —————————⟶

METHOD FOR TRANSMITTING DOWNLINK REFERENCE SIGNALS IN A MULTI-ANTENNA WIRELESS COMMUNICATION SYSTEM

CROSS-REFERENCE TO RELATED APPLICATIONS

This application claims the benefit of the Korean Patent Application Nos. 10-2008-0132996, filed on Dec. 24, 2008, 10-2009-0085402, filed on Sep. 10, 2009, which are hereby incorporated by reference as if fully set forth herein.

This application also claims the benefit of U.S. Provisional Application Ser. No. 61/109,894, filed on Oct. 30, 2008, 61/173,210, filed on Apr. 28, 2009, the content of which is hereby incorporated by reference herein in their entirety.

BACKGROUND OF THE INVENTION

1. Field of the Invention

The present invention relates to a communication method in a wireless communication system, and more particularly, to a method for transmitting a downlink reference signal in a multi-antenna wireless communication system.

2. Discussion of the Related Art

3rd Generation Partnership Project (3GPP) wireless communication systems based on Wideband Code Division Multiple Access (WCDMA) radio access technology have been deployed widely all over the world. The first evolution of WCDMA, High Speed Downlink Packet Access (HSDPA) provides the 3GPP with a highly competitive radio access technology in a mid-term perspective.

Evolved Universal Mobile Telecommunication System (E-UMTS) was designed to offer high competitiveness in a long term perspective. The 3GPP is working on the standardization of E-UMTS, an evolution of WCDMA UMTS. E-UMTS is also called Long Term Evolution (LTE). For details of the technical specifications of UMTS and E-UMTS, refer to Release 7 and Release 8 of "3rd Generation Partnership Project; Technical Specification Group Radio Access Network"

The E-UMTS system largely includes User Equipments (UEs), Base Stations (BSs) (Node Bs or evolved Node Bs (eNBs)), and an Access Gateway (AG) located at an end of an Evolved UMTS Terrestrial Radio Access Network (E-UTRAN) and connected to an external network. In general, a BS may transmit multiple data streams simultaneously for a broadcast service, a multicast service, and/or a unicast service. The LTE system employs Orthogonal Frequency Division Multiplexing (OFDM) and Multiple Input Multiple Output (MIMO) to provide a variety of services on a downlink.

OFDM, which is a major HSDPA system, offers the benefit of high spectral efficiency since an allocated entire spectrum is available to all BSs. For OFDM modulation, a transmission band is divided into a plurality of orthogonal subcarriers in the frequency domain and a plurality of symbols in the time domain. Due to the division of the transmission band into a plurality of subcarriers, OFDM is characterized by a decreased bandwidth per subcarrier and an increased modulation time perspective view carrier. Because the plurality of subcarriers is transmitted in parallel, the transmission rate of digital data or symbols on a specific subcarrier is lower than a single carrier.

MIMO is a communication system using a plurality of Transmission (Tx) antennas and a plurality of Reception (Rx) antennas. The MIMO system may increase channel capacity linearly with the number of Tx and Rx antennas, without an additional increase in frequency bandwidth. There are two types of MIMO schemes, spatial diversity and spatial multiplexing. Spatial diversity increases transmission reliability by transmitting symbols in a plurality of channel paths, while spatial multiplexing increases transmission rate by transmitting different data streams simultaneously through a plurality of Tx antennas.

MIMO schemes may also be classified into open-loop MIMO and closed-loop MIMO depending on whether a transmitter has knowledge of channel information. Open-loop MIMO does not require that the transmitter is aware of channel information. Open-loop MIMO schemes include Per Antenna Rate Control (PARC), Per Common Basis Rate Control (PCBRC), vertical Bell Labs layered Space Time (BLAST), Space Time Trellis Code (STTC), random beamforming, etc. In contrast, the transmitter has channel information in closed-loop MIMO. The performance of a closed-loop MIMO system depends on how accurate channel information the transmitter gets. Closed-loop MIMO schemes include Per Stream Rate Control (PSRC), Transmit Adaptive Array (TxAA), etc.

Channel information is information about radio channels between a plurality of Tx antennas and a plurality of Rx antennas (e.g. attenuation, a phase shift, a time delay, etc.). Many stream paths exists according to the combinations of the Tx and Rx antennas and channel status fluctuates over time in the time and frequency domains in view of a multipath time delay, which is called fading, in the MIMO system. Accordingly, the transmitter calculates the channel information through channel estimation. Channel estimation is the process of estimating channel information required for recovering a distorted transmission signal. For example, the channel estimation is equivalent to estimation of the amplitude and reference phase of a carrier. In other words, the channel estimation is to estimate the frequency response of a radio interface or a radio channel.

For channel estimation, a reference value may be estimated from several Reference Signals (RSs) received from a BS using a two-dimensional channel estimator. An RS is symbols transmitted at a high power level without carrying actual data to help carrier phase synchronization and BS information acquisition. Both the transmitter and the receiver may perform channel estimation using RSs. Specifically, the RS-based channel estimation is to estimate a channel using symbols known to both the transmitter and the receiver and recover data based on the channel estimate. An RS is called a pilot signal.

The MIMO system supports Time Division Duplex (TDD) and Frequency Division Duplex (FDD). In TDD, downlink transmission and uplink transmission take place in the same frequency area, thereby making it possible to estimate a downlink channel from an uplink channel based on a reciprocity principle.

The WCDMA-based wireless communication technology has evolved to LTE. Nevertheless, the demands and expectations of users and service providers are on the increase. Considering other wireless access technologies are under development, a further technological evolution is required to achieve future competitiveness. The requirements of the new technological evolution include the reduction of cost per bit, the increase of service availability, flexible use of frequency bands, simplified structures and open interfaces, appropriate power consumption of UEs, etc.

In this context, the 3GPP is preparing for standardization of a successor to LTE, so-called LTE-Advanced (LTE-A). One of major differences between LTE and LTE-A is the number of supported multiple antennas. While a legacy LTE system supports up to four antennas, whereas an LTE-A system aims to support up to eight antennas. Therefore, the LTE-A system should be able to support downlink transmission of RSs through up to eight antennas. Especially in the LTE-A system, an LTE terminal able to recognizing up to four antennas may coexist with an LTE-A terminal able to recognizing up to eight antennas.

SUMMARY OF THE INVENTION

An object of the present invention devised to solve the problem lies on a method for efficiently transmitting downlink RSs in a multi-antenna wireless communication system.

Another object of the present invention devised to solve the problem lies on a method for efficiently transmitting downlink RSs, when multiple antennas increase in number in a multi-antenna wireless communication system.

Another object of the present invention devised to solve the problem lies on a method for transmitting downlink RSs with backward compatibility, when multiple antennas increase in number in a multi-antenna wireless communication system.

A further object of the present invention devised to solve the problem lies on a method for efficiently transmitting RSs in an environment where UEs with different capabilities coexist.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

The object of the present invention can be achieved by providing a method for transmitting RSs on a downlink in a multi-antenna wireless communication system, including allocating RSs for a first antenna group to a subframe having a predetermined area with different access levels for UEs having different access capabilities, pairing RSs for a second antenna group with RSs for the first antenna group, allocating the paired RSs to the predetermined area of the subframe in CDM, and transmitting the subframe on the downlink.

In another aspect of the present invention, provided herein is a method for transmitting RSs on a downlink in a multi-antenna wireless communication system, including allocating RSs for a first antenna group to a subframe having a predetermined area with different access levels for UEs having different access capabilities, pairing RSs for a second antenna group with RSs for the first antenna group and allocating the paired RSs to the predetermined area of the subframe in CDM, if a rank is equal to or larger than a predetermined value, and transmitting the subframe on the downlink.

In another aspect of the present invention, provided herein is a method for performing channel estimation in a multi-antenna wireless communication system, including receiving a subframe in which RSs for first and second antenna groups are allocated, extracting the RSs for the first and second antenna groups, and performing channel estimating using the extracted RSs. The subframe includes a predetermined area with different access levels for UEs having different access capabilities, and the RSs for the second antenna group are paired with RSs for the first antenna group and allocated to the predetermined area of the subframe in CDM.

In another aspect of the present invention, provided herein is a method for performing channel estimation in a multi-antenna wireless communication system, including receiving a subframe in which RSs for first and second antenna groups are allocated, extracting the RSs for the first and second antenna groups, and performing channel estimating using the extracted RSs. The subframe includes a predetermined area with different access levels for UEs having different access capabilities, and the RSs for the second antenna group are paired with RSs for the first antenna group and allocated to the predetermined area of the subframe in CDM, if a rank is equal to or larger than a predetermined value.

In another aspect of the present invention, provided herein is a method for transmitting RSs on a downlink in a multi-antenna wireless communication system, including allocating RSs for a first antenna group to a subframe, allocating RSs for a second antenna group at DRS positions predetermined for DRS allocation in CDM, and transmitting the subframe on the downlink. The predetermined DRS positions are distributed at an equal frequency spacing across time and frequency domains in the subframe.

In a further aspect of the present invention, provided herein is a method for performing channel estimation in a multi-antenna wireless communication system, including receiving a subframe in which RSs for first and second antenna groups are allocated, extracting the RSs for the first and second antenna groups, and performing channel estimating using the extracted RSs. The RSs for the second antenna group are allocated at DRS positions predetermined for DRS allocation in CDM and The predetermined DRS positions are distributed at an equal frequency spacing across time and frequency domains in the subframe.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 12 is flowcharts illustrating methods for transmitting RSs for five to eight Tx antennas in a Broadcast/Multicast Single Frequency Network (MBSFN) subframe according to an exemplary embodiment of the present invention.

FIGS. 14(a) and 14(b) illustrate RS patterns in case of a short channel delay, when Code Division Multiplexing (CDM) is applied to antenna pairing according to an exemplary embodiment of the present invention.

FIG. 15(a) illustrates an example of applying CDM to antenna pairing when a RS frequency spacing is 6 according to an exemplary embodiment of the present invention.

FIG. 15(b) illustrates a time-domain representation of FIG. 15(a).

FIGS. 18(a) and 18(b) illustrate RS patterns to which CDM is applied when RSs for antenna port 0 to antenna port 3 are re-positioned according to an exemplary embodiment of the present invention.

FIG. 19 illustrates the channel delay spread of RSs observed in the time domain, when the RS patterns illustrated in FIG. 18 are used in an environment experiencing a long channel delay.

FIG. 20 illustrates the channel delay spread of RSs observed in the time domain, when the RS patterns illustrated in FIG. 18 are used in an environment experiencing a short channel delay.

FIG. 32 illustrates an allocation of DRS positions in a subframe using an extended CP according to another exemplary embodiment of the present invention.

DETAILED DESCRIPTION OF THE INVENTION

Reference will now be made in detail to the preferred embodiments of the present invention, examples of which are illustrated in the accompanying drawings. Embodiments of the present invention as described below are examples of applying the technical features of the present invention to an Orthogonal Frequency Division Multiplexing (OFDM)-Multiple Input Multiple Output (MIMO) system.

MIMO System Modeling

Figure 1:
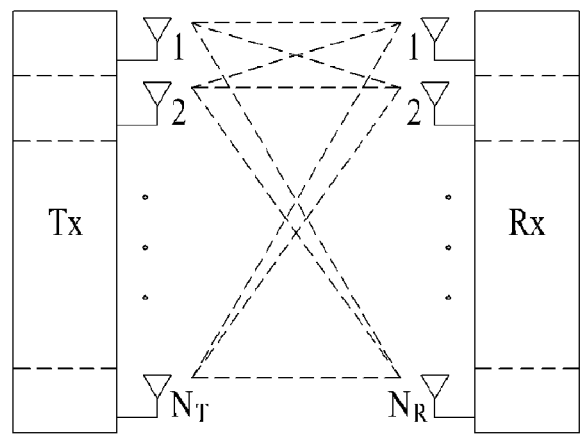
FIG. 1 illustrates the configuration of a Multiple Input Multiple Output (MIMO) system.

FIG. 1 illustrates the configuration of a typical MIMO wireless communication system.

Referring to FIG. 1, a simultaneous increase in Transmission (Tx) antennas of a transmitter to NT and in Reception (Rx) antennas of a receiver to NR increases a theoretical channel transmission capacity in proportion to the number of antennas, compared to use of a plurality of antennas at only one of the transmitter and the receiver. Therefore, transmission rate is increased and frequency efficiency is remarkably increased. Given a maximum transmission rate Ro that may be achieved in case of a single antenna, the increase of channel capacity may increase the transmission rate, in theory, to the product of Ro and Ri in case of multiple antennas. Ri is a transmission rate increase rate.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards including standards for 3rd Generation (3G) mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

A communication scheme in the MIMO system will be described below using a mathematical model. It is assumed that there are NT Tx antennas and NR Rx antennas in the MIMO system.

Regarding a transmission signal, up to NT pieces of information can be transmitted through the NT Tx antennas, as expressed as the following vector.

$$S=[S_1, S_2, \ldots, S_{N_T}]^T \quad \text{[Equation 2]}$$

A different transmit power may be applied to each piece of transmission information $S_1, S_2, \ldots, S_{N_T}$. Let the transmit power levels of the transmission information be denoted by $P_1, P_2, \ldots, P_{N_T}$, respectively. Then the transmit power-controlled transmission information S may be given as [Equation 3].

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Let's consider a case where actual NT transmitted signals $x_1, x_2, \ldots, x_{N_T}$ are configured by applying a weight matrix W to the transmit power-controlled information vector $\hat{S}$. The weight matrix W functions to appropriately distribute the transmission information to the Tx antennas according to transmission channel statuses, etc. These transmitted signals $x_1, x_2, \ldots, x_{N_T}$ are represented as a vector X, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

where wij denotes a weight for a jth piece of information transmitted through an ith Tx antenna and the weights are expressed as the matrix W. W is also referred to as a precoding matrix.

Given NR Rx antennas, signals received at the Rx antennas, $y_1, y_2, \ldots, y_{N_R}$ may be represented as the following vector.

$$y=[y_1, y_2, \ldots, y_{N_R}]^T \quad \text{[Equation 6]}$$

When channels are modeled in the MIMO wireless communication system, they may be distinguished according to the indexes of Tx and Rx antennas. A channel between a jth Tx antenna and an ith Rx antenna is represented as hij. It is to be noted herein that the index of the Rx antenna precedes that of the Tx antenna in hij.

Figure 2:
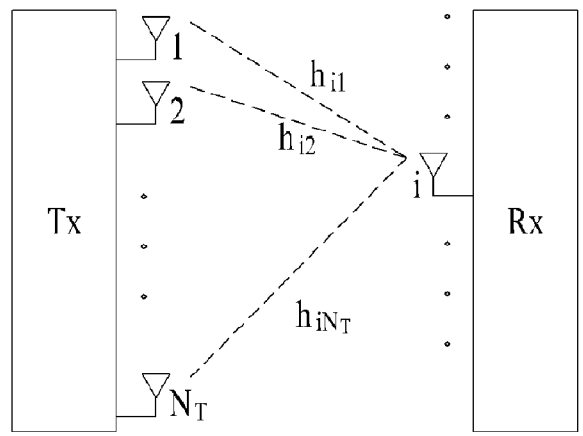
FIG. 2 illustrates channels from NT Transmission (Tx) antennas to an ith Reception (Rx) antenna.

FIG. 2 illustrates channels from NT Tx antennas to an ith Rx antenna. Referring to FIG. 2, the channels from the NT Tx antennas to the ith Rx antenna may be expressed as [Equation 7].

$$h_i^T=[h_{i1}, h_{i2}, \ldots, h_{iN_T}] \quad \text{[Equation 7]}$$

Hence, all channels from the NT Tx antennas to the NR Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

In the channel matrix H, the number of rows is equal to that of the Rx antennas, NR and the number of columns is equal to that of the Tx antennas, NT. Thus, the channel matrix H is of size NR x NT.

Actual channels experience the above channel matrix H and then are added with Additive White Gaussian Noise (AWGN). The AWGN $n_1, n_2, \ldots, n_{N_R}$ added to the NR Rx antennas is given as the following vector.

$$n=[n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the rank of a matrix is defined as the minimum of the numbers of independent rows or columns. Accordingly, the rank of the matrix is not larger than the number of rows or columns. For example, the rank of the channel matrix H, rank (H) is limited as follows.

$$\text{rank}(H) \leq \min(N_T, N_R) \quad \text{[Equation 11]}$$

If the matrix is eigen value-decomposed, its rank may be defined as the number of non-zero eigen values. Similarly, in case of Singular Value Decomposition (SVD), the rank may be defined as the number of non-zero singular values. In a physical sense, therefore, the rank of a channel matrix is the maximum number of different pieces of information that can be transmitted on given channels.

Transmitter and Receiver in MIMO System

Figure 3:
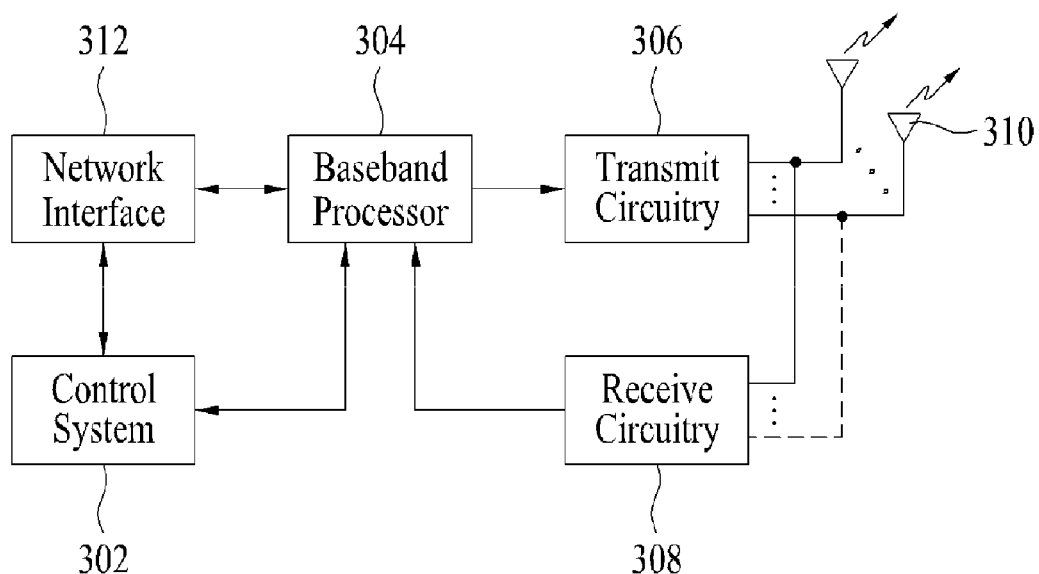
FIG. 3 is a block diagram of a Base Station (BS) which is applicable to an exemplary embodiment of the present invention.

FIG. 3 is a block diagram of a BS which is applicable to an exemplary embodiment of the present invention.

Referring to FIG. 3, the BS generally includes a control system 302, a baseband processor 304, a transmit circuitry 306, a receive circuitry 308, multiple antennas 310, and a network interface 312. The receive circuitry 308 receives a radio signal from a UE through the multiple antennas 310. Preferably, a low noise amplifier (not shown) and a filter (not shown) amplify the received signal and cancel broadband interference from the amplified signal. A downconversion and analog-to-digital conversion circuitry (not shown) downconverts the filtered signal to an Intermediate Frequency (IF) or baseband signal and digitizes the IF or baseband signal to one or more digital streams.

The baseband processor 304 processes the digital signal and extracts information or data bits from the processed signal. The processing includes demodulation, decoding, error correction, etc. The baseband processor 304 is configured usually with one or more Digital Signal Processors (DSPs). Subsequently, the extracted information or data bits are transmitted to a wireless network through the network interface 312 or to another UE serviced by the BS. The network interface 312 interworks with a circuit switched network that forms part of the wireless network connectable to a central network controller and a Public Switched Telephone Network (PSTN).

For transmission, the baseband processor 304 receives digital data carrying voice, data or control information from the network interface 312 under the control of the control system 302 and encodes the digital data. The transmit circuitry 306 modulates the encoded data to a carrier having a desired transmission frequency or frequencies. A power amplifier (not shown) amplifies the modulated carrier signal to a power level appropriate for transmission. The amplified signal is transmitted through the multiple antennas 310.

Figure 4:
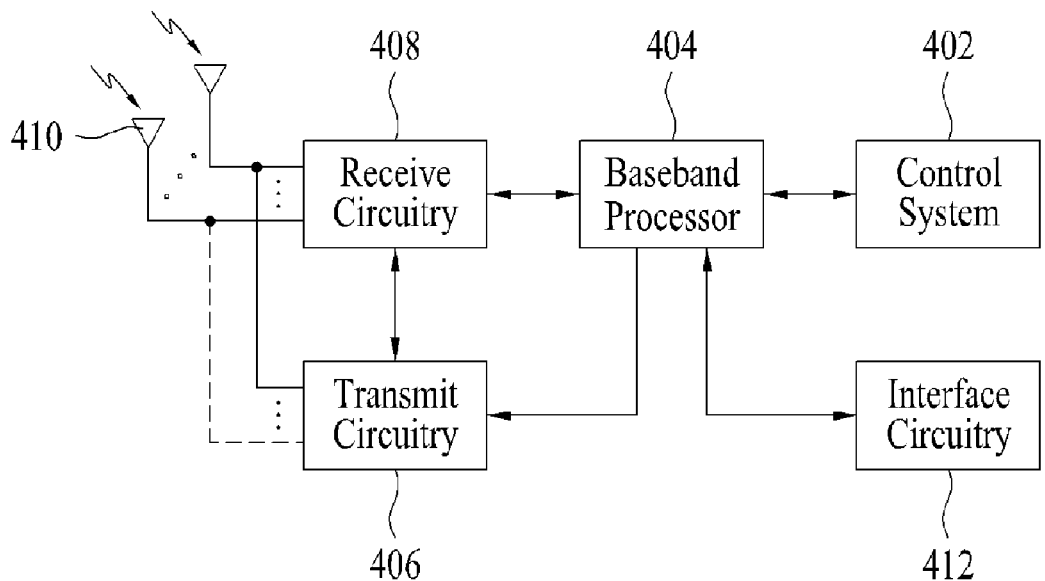
FIG. 4 is a block diagram of a User Equipment (UE) which is applicable to an exemplary embodiment of the present invention.

FIG. 4 is a block diagram of a UE which is applicable to an exemplary embodiment of the present invention.

Referring to FIG. 4, the UE generally includes a control system 402, a baseband processor 404, a transmit circuitry 406, a receive circuitry 408, multiple antennas 410, and a user interface 412. The receive circuitry 408 receives a radio signal carrying information from one or more BSs through the multiple antennas 410. Preferably, a low noise amplifier (not shown) and a filter (not shown) amplify the received signal and cancel broadband interference from the amplified signal. A downconversion and analog-to-digital conversion circuitry (not shown) downconverts the filtered signal to an IF or baseband signal and digitizes the IF or baseband signal to one or more digital streams. The baseband processor 404 processes the digital signal and extracts information or data bits from the processed signal. The processing includes demodulation, decoding, error correction, etc. The baseband processor 404 is configured usually with one or more Digital Signal Processors (DSPs) and Application Specific Integrated Circuits (ASICs).

For transmission, the baseband processor 404 receives digital data carrying voice, data or control information from the user interface 412 under the control of the control system 402 and encodes the digital data. The transmit circuitry 406 modulates the encoded data to a carrier having a desired transmission frequency or frequencies. A power amplifier (not shown) amplifies the modulated carrier signal to a power level appropriate for transmission. The amplified signal is transmitted through the multiple antennas 410.

Figure 5:
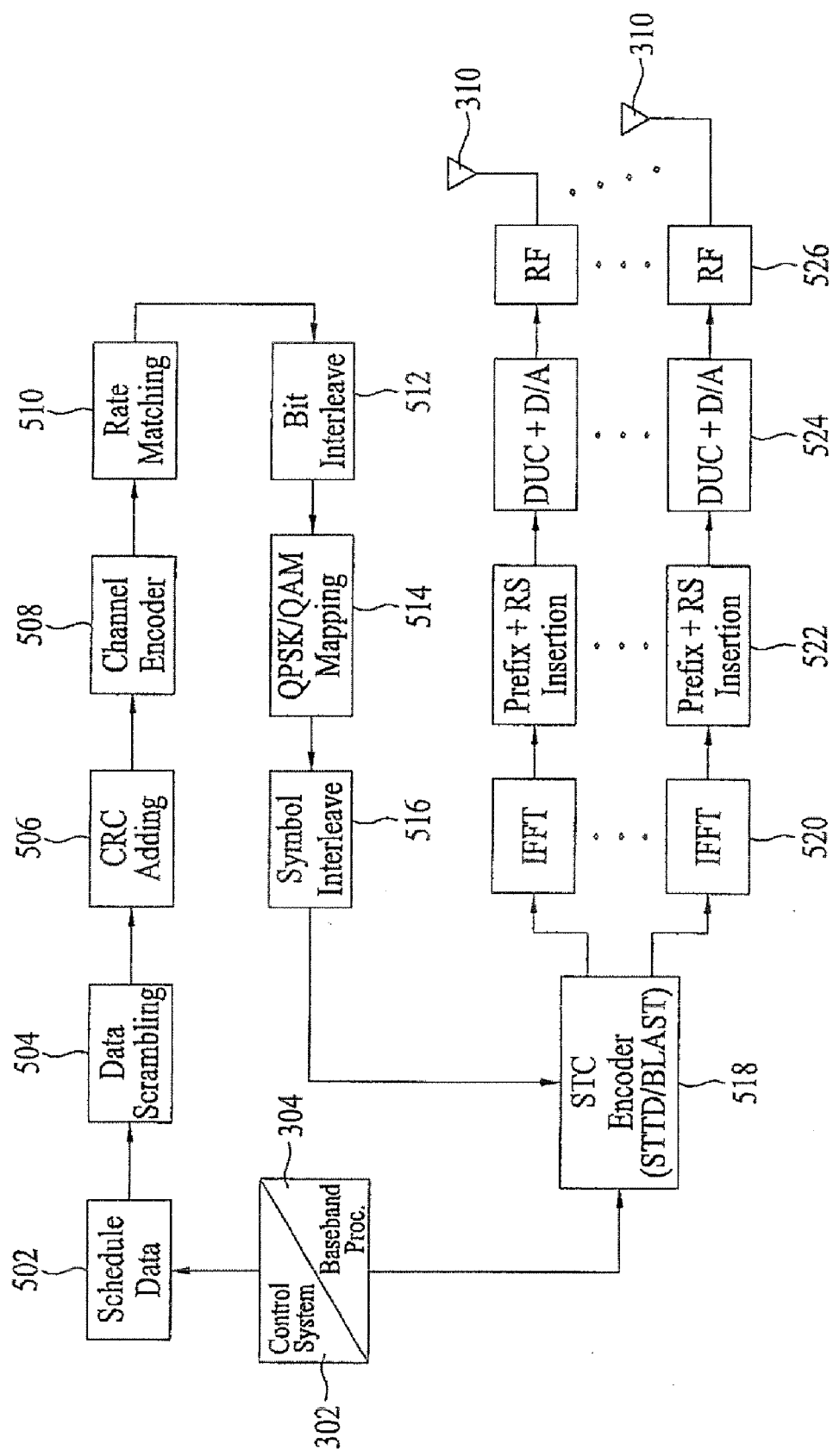
FIG. 5 is a block diagram of a transmitter which is applicable to an exemplary embodiment of the present invention.

FIG. 5 is a block diagram of a transmitter which is applicable to an exemplary embodiment of the present invention.

Referring to FIG. 5, while the structure of the transmitter is described in the context of a BS, it will be understood by those skilled in the art that the transmitter structure illustrated in FIG. 5 is applicable for both downlink and uplink transmissions. Also, the illustrated transmission mechanism is intended for, but not limited to, a variety of multiple access schemes including Code Division Multiple Access (CDMA), Frequency Division Multiple Access (FDMA), Time Division Multiple Access (TDMA), and Orthogonal Frequency Division Multiplexing (OFDM).

Initially, the network transmits data directed to UEs to the BS. A data scrambler 504 scrambles a bit stream which is scheduled data, in such a manner that the Peak-to-Average Power Ratio (PAPR) of the data is decreased. A Cyclic Redundancy Check (CRC) adder 506 adds a CRC to the scrambled data. To facilitate data recovery and error correction of a UE, a channel encoder 508 encodes the CRC-added data. The channel coding may provide redundancy to the data effectively. For the channel coding, the channel encoder 508 may use turbo coding.

A mapper 514 maps the processed data bits to symbols in a predetermined baseband modulation scheme such as Quadrature Amplitude Modulation (QAM) or Quadrature Phase Shift Keying (QPSK). Bit groups are mapped to symbols each representing a position on an amplitude-phase constellation. Subsequently, a Space Time Coding (STC) encoder 518 encodes a symbol block according to a selected STC coding mode and provides as many (N) outputs as the number of Tx antennas 310. Inverse Fast Fourier Transform (IFFT) processors 520 IFFT-process the symbol streams received from the STC encoder 518. Prefix and RS inserters 522 insert Cyclic Prefixes (CPs) and RSs into the IFFT signals. Digital UpConverter (DUC) and Digital-to-Analog (D/A) converters 524 upconvert the CP and RS-inserted signals to IF signals in a digital area and convert the IF signals to analog signals. Radio Frequency (RF) modules 526 modulate, amplify, and transmit the analog signals through the Tx antennas 310 at desired RF frequencies.

Figure 6:
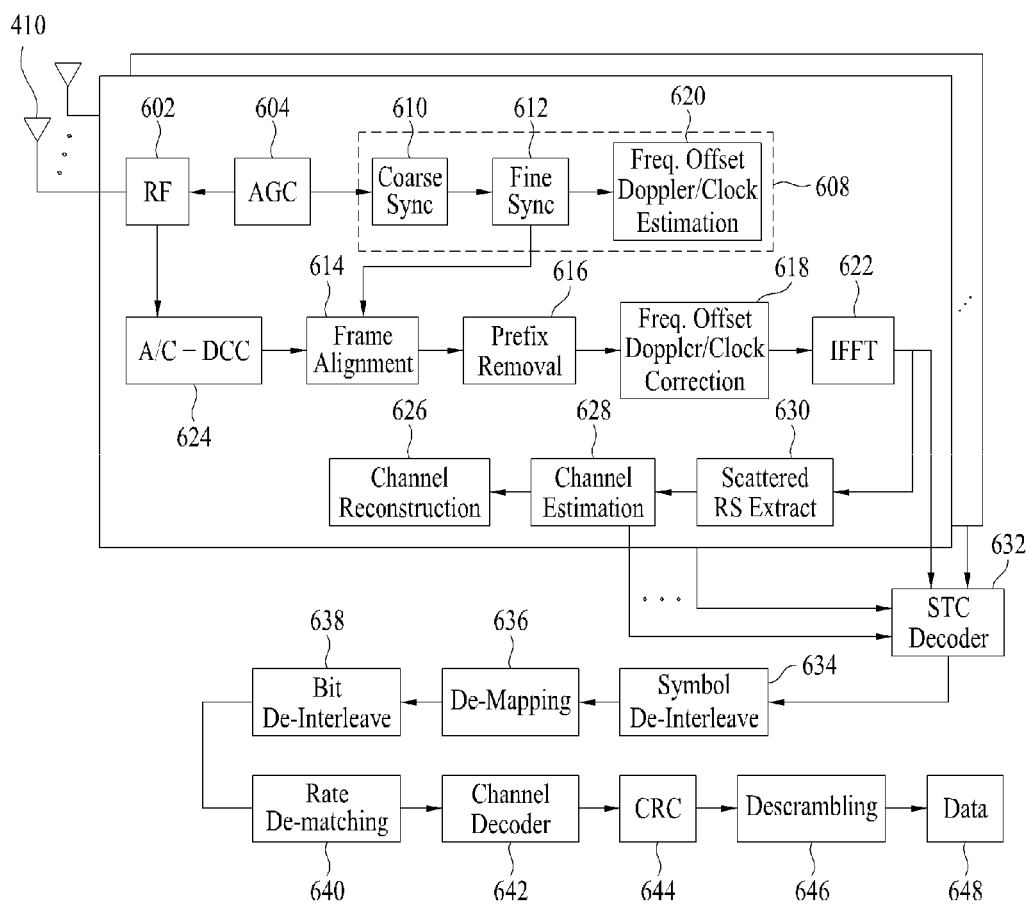
FIG. 6 is a block diagram of a receiver which is applicable to an exemplary embodiment of the present invention.

FIG. 6 is a block diagram of a receiver which is applicable to an exemplary embodiment of the present invention.

Referring to FIG. 6, while the structure of the receiver is described in the context of a UE, it will be understood by those skilled in the art that the receiver structure illustrated in FIG. 6 is applicable for both downlink and uplink receptions.

Upon receipt of a signal through Rx antennas 410, an RF module 602 demodulates and amplifies the received signal. For notational simplicity, only one of multiple reception paths of the receiver is illustrated. An Analog-to-Digital (A/D) converter and Digital DownConverter (DDC) 604 converts the amplified analog signal to a digital signal and downconverts the frequency of the digital signal. An Automatic Gain Controller (AGC) 606 may use the digital signal to control an amplification gain in the RF module 602 based on the signal level of the received signal.

The digital signal is also provided to a synchronization module 608. The synchronization module 608 may include a coarse synchronizer 610 for performing coarse synchronization, a fine synchronizer 612 for performing fine synchronization, and a frequency offset/Doppler estimator 620. The output of the synchronization module 608 is provided to a frame aligner 614 and a frequency offset/Doppler corrector 618. A CP remover 616 eliminates a CP from an aligned frame and a Fast Fourier Transform (FFT) processor 622 FFT-processes the CP-free data. An RS extractor 630 extracts scattered RSs from the FFT frame and provides the RSs to a channel estimator 628. A channel reconstructor 626 reconstructs a radio channel based on the channel estimate. The channel estimation provides channel response information enough for an STC decoder 632 to decode symbols in accordance with the STC coding scheme used in the BS and recover the transmitted bits. The STC decoder 632 receives symbols acquired from the received signal and the channel estimates regarding the respective reception paths and performs STC decoding over each reception path to recover the transmitted symbols. The STC decoder 632 may perform Maximum Likelihood Detection (MLD) used for BLAST-based transmission. The outputs of the STC decoder 632 may be the Log Likelihood Ratios (LLRs) of the transmitted bits. A symbol deinterleaver 634 deinterleaves the STC-decoded symbols and a demapper 636 demaps the deinterleaved symbols to a bit stream. A bit deinterleaver 638 deinterleaves the bit stream. A rate dematcher 640 rate-dematches the deinterleaved bit stream and provides the rate-dematched bit stream to a channel decoder 642, for recovery of scrambled data and a CRC checksum. The channel decoder 642 may turbo-decode the rate-dematched bit stream. A CRC checker 644 removes the CRC checksum from the decoded data in a conventional manner and checks the scrambled data. Then a descrambler 646 recovers original data 648 by descrambling the CRC-checked data.

Reference Signals (RSs)

In a wireless communication system, a packet is transmitted on a radio channel. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. This signal is called a pilot signal or an RS. In case of data transmission and reception through multiple antennas, knowledge of channel states between Tx antennas and Rx antennas is required for successful signal reception. Accordingly, an RS should exist separately for each Tx antenna.

Figure 7:
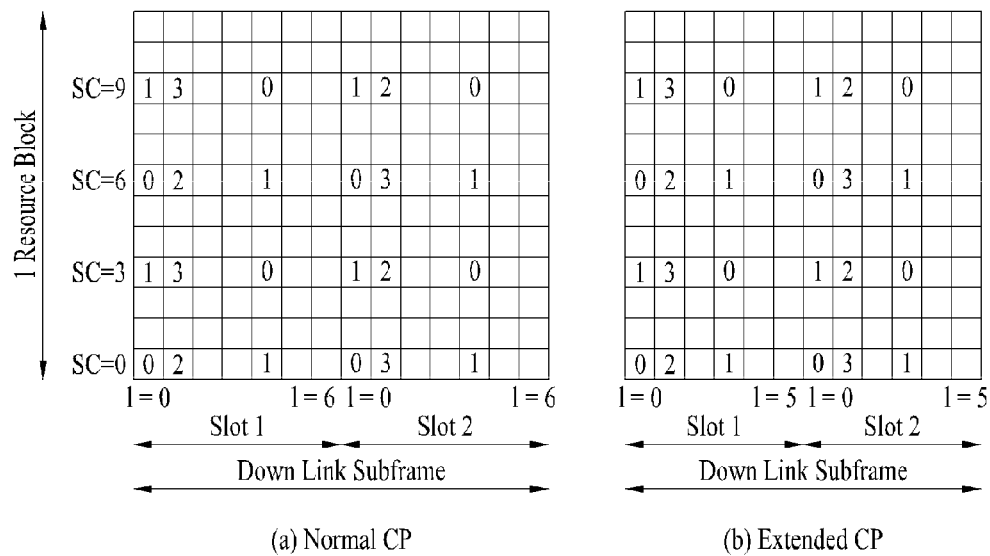
FIG. 7 illustrates a 3rd Generation Partnership Project Long Term Evolution (3GPP LTE) downlink Reference Signal (RS) allocation structure in case of a normal Cyclic Prefix (CP) and a 3GPP LTE downlink RS allocation structure in case of an extended CP.

FIG. 7 illustrates downlink RS allocation structures in 3GPP LTE. In FIG. 7, the horizontal axis represents time and the vertical axis represents frequency, with respect to one resource block. One subframe includes two slots. In case of a normal CP, each slot is composed of seven symbols as illustrated in FIG. 7(a), whereas in case of an extended CP, each slot includes six symbols as illustrated in FIG. 7(b). The extended CP is used usually in a long-delay environment. For a BS with four Tx antennas, resources allocated to RSs to be transmitted through antenna ports, antenna port 0 to antenna port 3 are denoted by '0', '1', '2' and '3', respectively. The RSs for antenna port 0 to antenna port 3 are Common RSs (CRSs). Reference character l denotes the index of an OFDM symbol and reference character SC denotes the index of a subcarrier.

Time/Frequency Spacing Between RSs

When a 20-MHz system is considered in 3GPP LTE, one symbol includes 2048 samples and the duration of a symbol is 66.67 μs (1 μs=10-6 sec). In case of a normal CP, the CP occupies 160 samples in the first one of seven symbols and 140 samples in each of the other six symbols. This means that the first symbol and the other symbols may cover channel delay spreads of 5.2 μs and 4.69 μs, respectively in case of the normal CP. In case of an extended CP, each of six symbols occupies 512 samples, thus covering a channel delay spread of 16.67 μs.

Referring to FIGS. 7(a) and 7(b), the frequency spacing between RSs for a specific antenna is 6. However, the actual frequency spacing between the RSs for the specific antenna is 3 because the RSs stagger within a slot or a subframe. A frequency spacing refers to the number of subcarriers between neighboring RSs along the frequency axis. The neighboring RSs do not need to be positioned in the same OFDM symbol. Rather, they may be distributed across a plurality of OFDM symbols, slots, or subframes along the time axis. The frequency spacing may vary with the profile of an OFDM system. For instance, the frequency spacing may be 15 kHz.

The relationship between the frequency spacing between RSs (referred to as a RS frequency spacing) and a channel estimation capability will be described in detail based on mathematical equations.

For example, if a sequence $x[i] = \{x_0, x_1, x_2, \ldots, x_{N-1}\}$ is Inverse Discrete Fourier Transform (IDFT)-processed, $$X[k] = \sum_{i=0}^{N-1} x[i] \cdot e^{j2\pi k \frac{i}{N}}, k = 0, 1, \ldots, N-1 \quad \text{[Equation 12]}$$

On the assumption that the RS frequency spacing is 'Z+1', Z data signals are interposed between neighboring RSs. To assess the effects of the RS frequency spacing on channel estimation, it is assumed that only RSs are transmitted. Then Z zeros are filled as the data signals between the RSs and the transmission sequence is expressed as $$y[i] = \{x_0, \underbrace{0, 0, \ldots, 0}_{Z \text{ zeros}}, x_1, \underbrace{0, 0, \ldots, 0}_{Z \text{ zeros}}, x_{02}, \ldots, x_{N-1}, \underbrace{0, 0, \ldots, 0}_{Z \text{ zeros}}\}.$$

If y[i] is IDFT-processed, $$Y[k] = \sum_{m=0}^{N(Z+1)-1} y[m] \cdot e^{j2\pi k \frac{m}{N(Z+1)}}, \quad \text{[Equation 12]}$$

$$k = 0, 1, \ldots, N(Z+1) - 1$$

where $$\begin{cases} y[m] = x[i], & m = (Z+1) \cdot i, \quad i = 0, 1, \ldots, N-1 \\ y[m] = 0, & \text{otherwise} \end{cases}$$

Equation 11 and Equation 12 reveal about the relationship between X[k] and Y[k] that X[k] occurs repeatedly as many times as the number of zeros, as follows.

$$Y[k] = \{\underbrace{X[0], X[1], \ldots, X[N-1]}_{N \text{ samples}}, \quad \text{[Equation 13]}$$

$$\ldots, \underbrace{X[0], X[1], \ldots, X[N-1]}_{N \text{ samples}}\}$$

Figure 8:
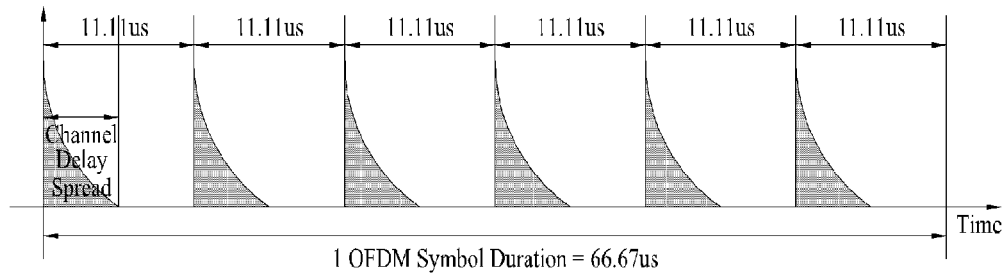
FIG. 8 illustrates the channel delay spread of RSs observed in the time domain when a RS frequency spacing is 6 in an environment using a normal CP.
Figure 9:
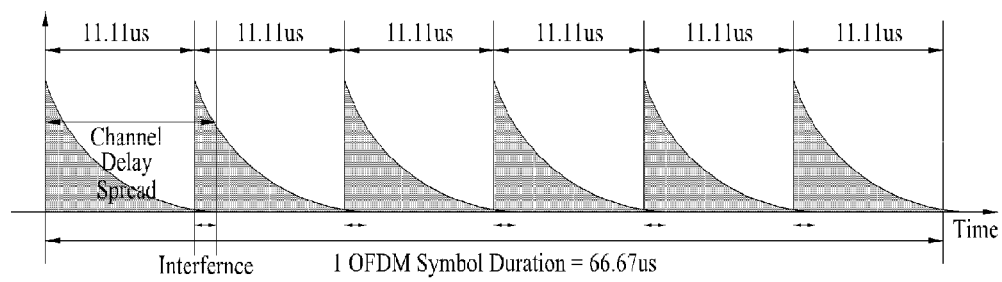
FIG. 9 illustrates the channel delay spread of RSs observed in the time domain when a RS frequency spacing is 6 in an environment using an extended CP.

FIGS. 8 and 9 illustrate RSs with a frequency spacing of 6, observed in the time domain. Referring to FIGS. 8 and 9, it is noted that an RS occurs six times during one OFDM symbol duration. Given an OFDM symbol duration of 66.66 μs, the RS appears every 11.11 μs in the time domain (that is, the period of the RS is 11.11 μs). Therefore, unless a channel delay spread exceeds 11.11 μs, it is possible to recover the original RS in theory. Herein, in case of a normal CP (of length 5.2 or 4.69 μs), a wireless environment experiencing a channel delay of up to 5.2 or 4.69 μs is assumed. In the environment using the normal CP, no interference exists between RSs although their frequency spacing is 6. Hence, the RSs may be recovered (see FIG. 8). On the other hand, for an extended CP (of length 16.67 μs), a wireless environment experiencing a channel delay of up to 16.67 μs is assumed. The frequency spacing of 6 between RSs may cause interference between them in the extended-CP environment (see FIG. 9).

Figure 10:
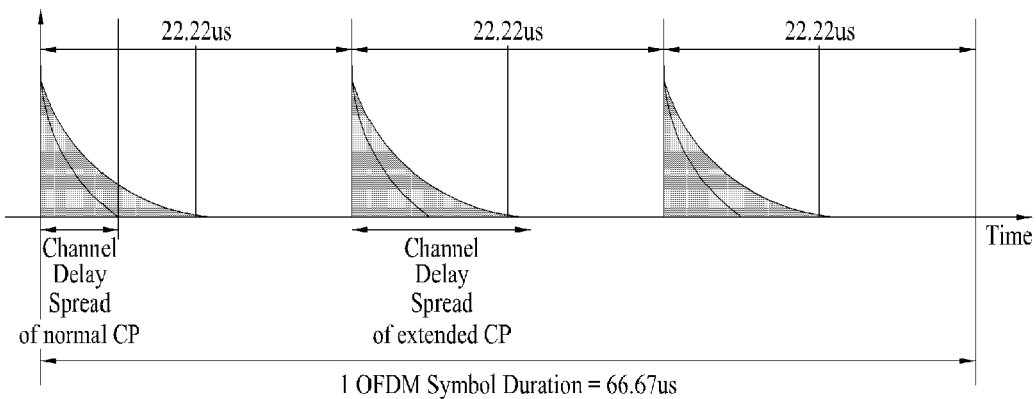
FIG. 10 illustrates the channel delay spread of RSs observed in the time domain when a RS frequency spacing is 3 in environments using a normal CP and an extended CP.

To mitigate the foregoing problem, a RS frequency spacing is set to 3 through staggering of RSs for each antenna in LTE. RSs with a frequency spacing of 3 observed in the time domain are illustrated in FIG. 10. Referring to FIG. 10, an RS occurs three times during one OFDM symbol duration because of the frequency spacing of 3. If the OFDM symbol duration is 66.66 μs, the RS occurs every 22.22 μs, which implies that a channel delay spread of 22.22 μs can be covered. Consequently, the RSs may be recovered irrespective of a CP length.

Code Division Multiplexing (CDM)-Cyclic Delay in Time Domain.

Multiplexing is to allocate RSs configured for different antennas to the same resource area. There are largely three multiplexing schemes, Time Division Multiplexing (TDM), Frequency Division Multiplexing (FDM), and Code Division Multiplexing (CDM). Among them, CDM is the process of multiplying different orthogonal codes (or orthogonal sequences) allocated to different antennas by RSs for the different antennas in the frequency domain and allocating the products to the same radio resources (time/frequency resources). The orthogonal codes may take the form of $$e^{j2\pi \frac{u}{M} i}.$$

The multiplication of RSs by orthogonal codes in the frequency domain may amount to delaying the RSs cyclically in the time domain. When the sequence $x[i]\{x_0, x_1, x_2, \ldots, x_{N-1}\}$ is multiplied by an orthogonal code, the resulting cyclic shift of RSs in the time domain is given as $$X'[k'] = \sum_{i=0}^{N-1} x[i] \cdot e^{j2\pi \frac{k'}{N} i} e^{j2\pi \frac{u}{M} i}, \quad \text{[Equation 14]}$$

$$N = MZ, k' = 0, 1, \ldots, N-1$$

$$= \sum_{i=0}^{N-1} x[i] \cdot e^{j2\pi \left(\frac{k'+uZ}{N}\right) i}$$

$$X'[(k-uZ)\bmod N] = \sum_{i=0}^{N-1} x[i] \cdot e^{j2\pi \frac{k}{N} i}$$

$x'[(k-uZ)\bmod N]=X[k]$

In this manner, multiplication of an RS by $$e^{j2\pi \frac{u}{M} i}$$

in the frequency domain leads to a cyclic delay of the RS in the time domain.

Evolution from LTE to LTE-A: Extension of MIMO System

An exemplary embodiment of the present invention is about a method for transmitting downlink RSs in the case where the number of Tx antennas increases from N to M (>N) in an existing system. As LTE assumes that the number of antennas used for downlink transmission is 4 (=N), an LTE UE is able to recognize four antennas. In contrast, LTE-A considers extension of the number of downlink Tx antennas to 8 (=M). While the exemplary embodiment of the present invention will be described below in the context of LTE-A, by way of example, it is applicable to any MIMO system satisfying the condition that M>N based on the same principle.

In the above environment, there coexist an LTE UE capable of identifying only four (=N) Tx antennas, as is a conventional case, and an LTE-A UE capable of identifying up to eight (=M) Tx antennas in the cell area of an LTE-A BS. Besides RSs supporting the conventional N antennas, additional RSs should be transmitted to support the four more (=M−N) antennas. It is necessary to transmit data and RSs to the LTE UE identifying only four Tx antennas without additional signaling in the environment added with the LTE-A UE capable of up to eight Tx antennas. While it is defined in LTE that antenna port 5 is used in a closed-loop rank 1 mode, antenna ports for an LTE-A system with an antenna extension to 8 will be labeled with 0 to 7, for the convenience' sake.

As noted from FIG. 7(a), an RS overhead is 14.3% in case of a normal CP. Accordingly, the exemplary embodiment of the present invention provides an RS transmission scheme based on CDM, which does not increase the RS overhead above 15% although the number of antennas is increased. So far, the terms "normal CP" and "extended CP" have been used from the perspective of the LTE system. Yet, the later-described exemplary embodiment of the present invention is also applicable to systems that cover many channel delays. Therefore, channel delays will be classified into a short channel delay and a long channel delay, hereinafter.

Embodiment 1

8Tx Antenna Design Based on UE Capabilities to Access Subframe

As described before, an LTE UE and an LTE-A UE coexist in the LTE-A system. To maintain backward compatibility with the LTE UE, the LTE-A system may use a plurality of subframes that offer different access levels to UEs according the capabilities of the UEs. For notational simplicity, the subframes available in the LTE-A system are categorized into two subframe types according to UE access capabilities: first subframe and second subframe.

Herein, the first subframe is defined as a subframe accessible to all UEs irrespective of their capabilities, and the second subframe is defined as a subframe including an area having different access levels for UEs with different access capabilities. In an extreme case, the entire second subframe may include only an area having different access levels for UEs with different access capabilities. When it is said that an area has different access levels for UEs with different access capabilities, this means that the area does not allow access to a UE with a predetermined access capability or the area is accessible only to a UE with another predetermined access capability. For example, the first subframe is accessible to both the LTE UE and the LTE-A UE, whereas the second subframe may include an area accessible to both the LTE UE and the LTE-A UE and an area accessible only to the LTE-A UE (case 1) or only the area accessible only to the LTE-A UE (case 2). In case 1, only part of the second subframe is available to the LTE system. In case 2, however, the LTE system cannot access any part of the second frame (e.g. slot 1: 1=0~slot 2: 1=5(6)). The second subframe may be a Broadcast/Multicast Single Frequency Network (MBSFN) subframe.

In this context, downlink RSs for antennas added to the LTE system are transmitted in the second subframe in accordance with the exemplary embodiment of the present invention. Now a detailed description will be made of the exemplary embodiment of the present invention, taking an MBSFN subframe as an example. The specific terms "LTE", "LTE-A", "LTE-UE", "LTE-A UE" and "MBSFN subframe" are used in the following description of the present invention to help the understanding of the present invention, which should not be construed as limiting the scope and spirit of the present invention.

Figure 11:
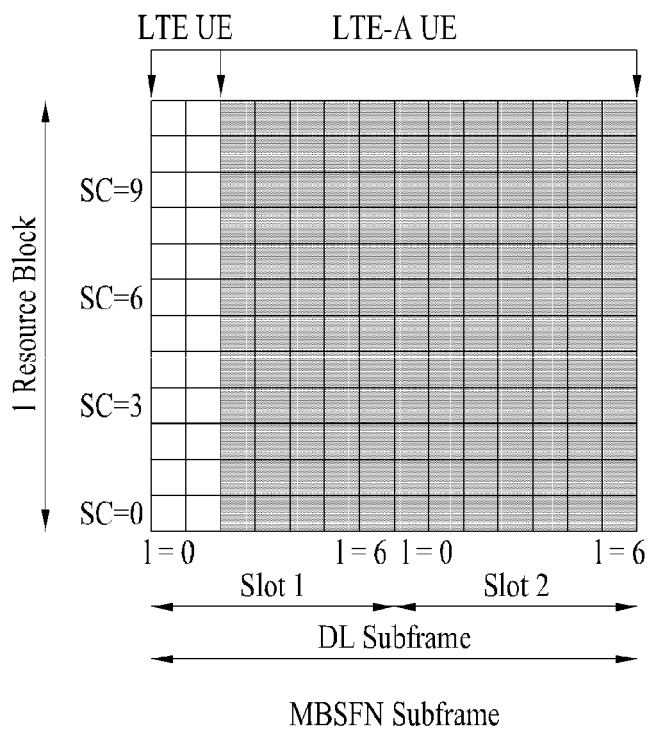
FIG. 11 illustrates an exemplary allocation of RSs to an MBSFN subframe in an environment experiencing a short channel delay.

FIG. 11 illustrates the structure of an MBSFN subframe. The term "MBSFN" is interchangeably used with various terms "Multi-Media Broadcast over a Single Frequency Network", "MBMS (Multimedia Broadcast/Multicast) over a Single Frequency Network", "MBMS Single Frequency Network", "Multicast/Broadcast over a Single Frequency Network", "Multicast Broadcast Single Frequency Network", etc.

Referring to FIG. 11, the MBSFN subframe includes two slots. One of the slots has seven OFDM symbols in case of a normal CP and six OFDM symbols in case of an extended CP.

Meanwhile, when the LTE system notifies the LTE UE of an MBSFN subframe by signaling, the LTE UE neither reads the data part of the MBSFN subframe nor uses channel information. Specifically, upon receipt of signaling indicating that a received subframe is an MBSFN one, the LTE UE uses only information carried in symbol 0 (1=0) and symbol 1 (1=1) in a first slot, Slot 1 (indicated by "LTE UE" in FIG. 11). The remaining OFDM symbols except the two OFDM symbols are freely available to the LTE-A UE irrespective of the operation of the LTE UE (shaded and indicated by "LTE-A UE" in FIG. 11). That is, the LTE UE is restricted in accessing and reading information from slot 1: 1=2 to 5 (6) and slot 2: 1=0 to 5 (6) of the MBSFN subframe, while the LTE-A UE is free to access and read information from slot 1: 1=2 to 5 (6) and slot 2: 1=0 to 5 (6) of the MBSFN subframe. Therefore, RSs for the LTE-A UE may be transmitted in slot 1: 1=2 to 5(6) and slot 2: 1=0 to 5 (6).

FIG. 12 is flowcharts illustrating examples of a method for transmitting RSs configured for antenna port 0 to antenna port 7 in a second subframe according to an exemplary embodiment of the present invention.

Referring to FIG. 12, a BS allocates RSs configured for a first antenna group to a subframe including a predetermined area with different access levels for UEs having different access capabilities in step S1210. The predetermined area is defined to be inaccessible to UEs supporting only antenna 0 to antenna 3. The UEs include an LTE UE. The subframe may be an MBSFN subframe and the predetermined area may be slot 1: 1=2 to slot 2: 1=5(6). Antennas used in a conventional MIMO system are members of the first antenna group. The conventional MIMO system may be a system supporting one to four antennas. Preferably, the first antenna group may include antenna port 0 to antenna port 3 and the RSs may be CRSs or Dedicated RSs (DRSs).

In step S1220 of FIG. 12(a), the BS pairs RSs for a second antenna group with the RSs for the first antenna group and allocates the paired RSs to the predetermined area in CDM. In another example, the BS pairs the RSs for the second antenna group with the RSs for the first antenna group and allocates the paired RSs to the predetermined area in CDM, only if a rank is equal to or larger than a predetermined value in step S1220 of FIG. 12(b). The predetermined value may vary with systems. For example, the predetermined value may be 5 for a MIMO system supporting eight Tx antennas. The use of CDM for a rank smaller than the predetermined value results in a decrease in RS transmit power. Accordingly, it may be efficient that the system operates in the same manner as the LTE system, instead of reducing the transmit power of the antennas to a half. The second antenna group has antennas added to the conventional MIMO system. The second antenna group may include one to four antennas. The second antenna group applies to a system supporting antenna port 4 to antenna port 7, which may be an LTE-A system. For example, the second antenna group includes antenna port 4 to antenna port 7.

Subsequently, the BS transmits the subframe on a downlink in step S1230.

Figure 13:
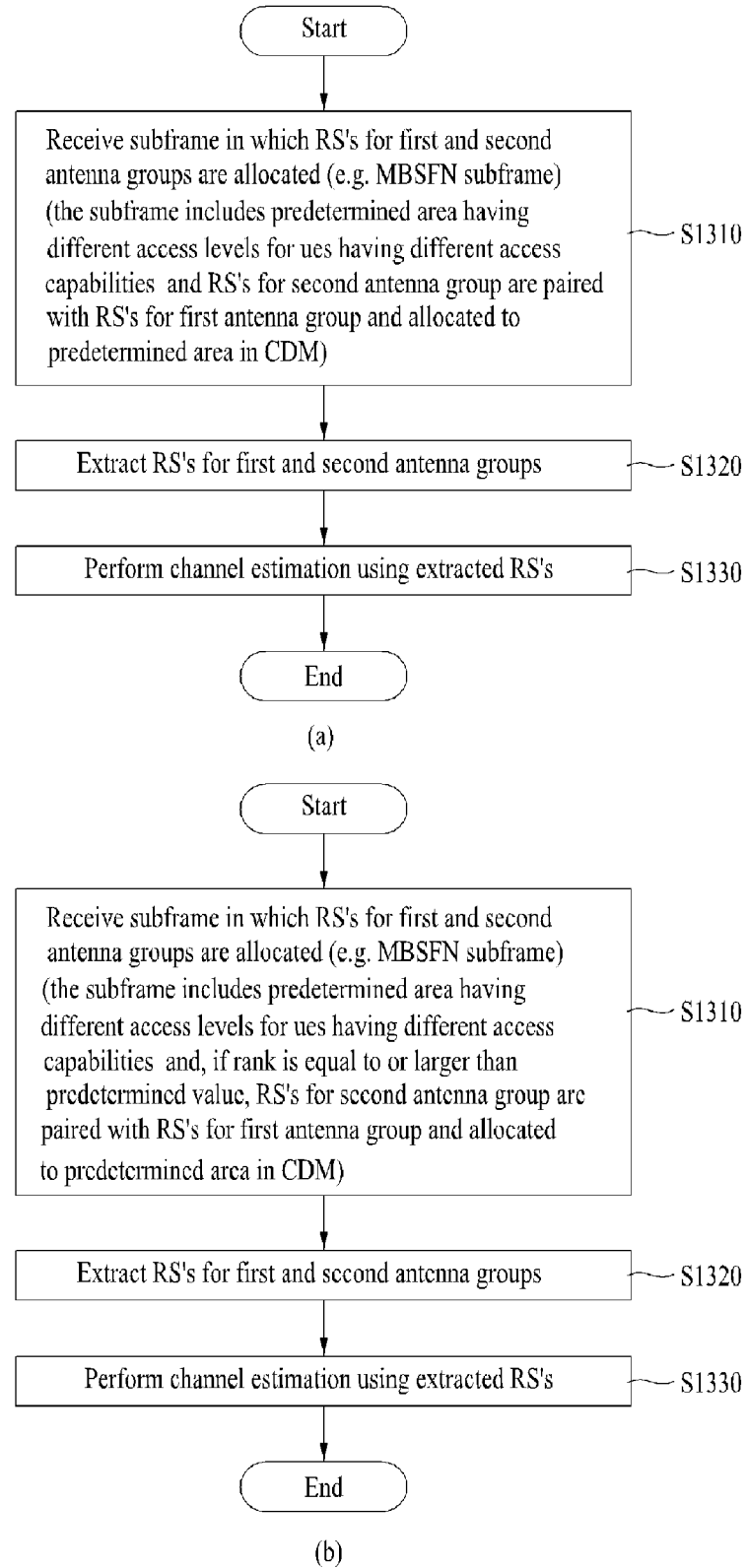
FIG. 13 is flowcharts illustrating methods for performing channel estimation in a UE when RSs for five to eight Tx antennas are transmitted in an MBSFN subframe according to an exemplary embodiment of the present invention.

FIG. 13 is flowcharts illustrating methods for performing channel estimation in a UE, when RSs configured for antenna port 0 to antenna port 8 are transmitted in a second subframe according to an exemplary embodiment of the present invention.

Referring to FIG. 13, the UE receives a subframe to which RSs configured for first and second antenna groups were allocated in step S1310. The subframe includes a predetermined area having different access levels for UEs having different access capabilities, and the RSs for the second antenna group were allocated to the predetermined area in CDM after being paired with the first antenna group in FIG. 13a. In another example, the RSs for the second antenna group were allocated to the predetermined area in CDM after being paired with the first antenna group, only if a rank is equal to or larger than a predetermined value in FIG. 13b. The predetermined value may vary with systems. For example, the predetermined value may be 5 for a system supporting eight Tx antennas. The RSs may be CRSs or DRSs.

Subsequently, the UE extracts the RSs for the first and second antenna groups from the subframe in step S1320 and performs channel estimation using the extracted RSs in step S1330. The UE supports antenna port 4 to antenna port 7. The UE may be an LTE-A UE. The first antenna group, the second antenna group, the UE capability, and the predetermined area are the same, in their meanings, as those described with reference to FIG. 12.

A method for allocating RSs for an LTE-A UE in an MBSFN subframe will be described in detail, taking specific examples.

The LTE system regulates the number of RSs, as illustrated in Table 1, in order to maintain the maximum overhead of RS transmission below 15%. The LTE system supports antenna port 0 to antenna port 3 and designs them such that the numbers of RSs for the respective antennas are 8, 8, 4 and 4 per subframe. Because four RSs are defined for antenna port 2 and antenna port 3 each, it is proposed that when the LTE-A system supports antenna port 0 to antenna port 7, the number of RSs for each of the additional antenna ports, antenna port 4 to antenna port 7 is limited to 4. Although the accuracy of channel estimation increases with the number of RSs, each of antenna port 2 and antenna port 3 is limited to four RSs in the LTE environment supporting four antennas and thus it is preferable to impose the same restriction on the added antennas. In Table 1, the numbers of RSs for the added antenna ports are marked (i.e. shaded).

TABLE 1

| Port | 0 | 1 | 2 | 3 | 4 | 5 | 6 | 7 |
|---|---|---|---|---|---|---|---|---|
| Number of RSs | 8 | 8 | 4 | 4 | 4 | 4 | 4 | 4 |

As noted from Table 1, 16 more RSs are required for antenna port 4 to antenna port 7 to serve the LTE-A UE. In this regard, referring to the MBSFN subframe illustrated in FIG. 7, the remaining symbols except the first two symbols carry 16 RSs in LTE. Hence, RSs for the additional antennas to serve the LTE-A UE are at the same positions of RSs for the LTE-UE in an exemplary embodiment of the present invention. The use of the same RS positions as used for the LTE UE makes it possible to still use hardware used in the LTE UE.

To CDM-multiplex the RSs transmitted through antenna port 0 to antenna port 3 with the RSs transmitted through antenna port 4 to antenna port 7, antenna pairing is carried out. Antenna port 0 to antenna port 3 used in the LTE system may be paired with antenna port 4 to antenna port 7 added for the LTE-A system in arbitrary combinations. For example, the RSs for antenna port 0 to antenna port 3 may be allocated to the area that is set to be inaccessible to the LTE UE in the MBSFN subframe according to Pattern 1-1 or Pattern 1-2. The area covers symbol 2 to symbol 5 (or symbol 6) of slot 1 (1=2 to 5 (6) in slot 1) and symbol 0 to symbol 5 (or symbol 6) of slot 2 (1=0 to 5 (6) in slot 2).

[Pattern 1-1]

| | Slot 1 | | Slot 2 | |
|---|---|---|---|---|
| Subframe | l = 3 or l = 4 | l = 0 | l = 1 | l = 3 or l = 4 |
| Antenna port 0 | 3, 9 | 0, 6 | — | 3, 9 |
| Antenna port 1 | 0, 6 | 3, 9 | — | 0, 6 |
| Antenna port 2 | — | — | 3, 9 | — |
| Antenna port 3 | — | — | 0, 6 | — |

[Pattern 1-2]

| | Slot 1 | | Slot 2 | |
|---|---|---|---|---|
| Subframe | l = 3 or l = 4 | l = 0 | l = 1 | l = 3 or l = 4 |
| Antenna port 0 | — | 0, 6 | — | 3, 9 |
| Antenna port 1 | — | 3, 9 | — | 0, 6 |
| Antenna port 2 | 0, 6 | — | 3, 9 | — |
| Antenna port 3 | 3, 9 | — | 0, 6 | — |

In Pattern 1-1 and Pattern 1-2, l denotes the index of an OFDM symbol, the numerals in the tables denote subcarrier indexes within a resource block, and - denotes non-RS allocation.

Antenna port 0 to antenna port 3 may be permuted and their RSs may be shifted along the frequency or time axis. The shift may be determined using a cell Identifier (ID) or the like.

Case of Short Channel Delay

An RS frequency spacing may be 3 or 6 to cover a short channel delay, for example, 5 to 6 μs. FIGS. 14(*a*) and 14(*b*) illustrate exemplary RS patterns for pairing antenna port 0 to antenna port 3 with antenna port 4 to antenna port 7. Only a specific area to which CDM is applied (i.e. an area defined to be inaccessible to the LTE UE) is shown in FIGS. 14(*a*) and 14(*b*), in which the RSs for antenna port 0 to antenna port 7 are denoted by reference numerals 0 to 7.

The RS patterns illustrated in FIGS. 14(*a*) and 14(*b*) are tabulated as follows.

[Pattern 1-3]

| | Slot 1 | | | Slot 2 | | |
|---|---|---|---|---|---|---|
| Subframe | l = 0 | l = 1 | l = 3 or l = 4 | l = 0 | l = 1 | l = 3 or l = 4 |
| Antenna port 0 | 0, 6 | — | 3, 9 | 0, 6 | — | 3, 9 |
| Antenna port 1 | 3, 9 | — | 0, 6 | 3, 9 | — | 0, 6 |
| Antenna port 2 | — | 0, 6 | — | — | 3, 9 | — |

[Pattern 1-3] -continued

| | Slot 1 | | | Slot 2 | | |
|---|---|---|---|---|---|---|
| Subframe | l = 0 | l = 1 | l = 3 or l = 4 | l = 0 | l = 1 | l = 3 or l = 4 |
| Antenna port 3 | — | 3, 9 | — | — | 0, 6 | — |
| CDM (Code Division Multiplexing) | | | | | | |
| Antenna port 4 | — | — | — | 0, 6 (0) | — | 3, 9 (0) |
| Antenna port 5 | — | — | — | 3, 9 (1) | — | 0, 6 (1) |
| Antenna port 6 | — | — | 0, 6 (1) | — | 3, 9 (2) | — |
| Antenna port 7 | — | — | 3, 9 (0) | — | 0, 6 (3) | — |

[Pattern 1-4]

| | Slot 1 | | | Slot 2 | | |
|---|---|---|---|---|---|---|
| Subframe | l = 0 | l = 1 | l = 3 or l = 4 | l = 0 | l = 1 | l = 3 or l = 4 |
| Antenna port 0 | 0, 6 | — | 3, 9 | 0, 6 | — | 3, 9 |
| Antenna port 1 | 3, 9 | — | 0, 6 | 3, 9 | — | 0, 6 |
| Antenna port 2 | — | 0, 6 | — | — | 3, 9 | — |
| Antenna port 3 | — | 3, 9 | — | — | 0, 6 | — |
| CDM (Code Division Multiplexing) | | | | | | |
| Antenna port 4 | — | — | 0, 6 (1) | — | 3, 9 (2) | — |
| Antenna port 5 | — | — | 3, 9 (0) | — | 0, 6 (3) | — |
| Antenna port 6 | — | — | — | 0, 6 (0) | — | 3, 9 (0) |
| Antenna port 7 | — | — | — | 3, 9 (1) | — | 0, 6 (1) |

In Pattern 1-3 and Pattern 1-4, l denotes the index of an OFDM symbol, the numerals in the tables denote subcarrier indexes within a resource block, - denotes non-RS allocation, and the numerals within the brackets denote paired antennas.

Antenna port 0 to antenna port 3 and antenna port 4 to antenna port 7 may be permuted independently and their RSs may be shifted along the frequency or time axis. The shift may be determined using a cell ID or the like.

Referring to Pattern 1-3 illustrated in FIG. 14(*a*), the antennas are paired into (0, 4), (1, 5), (2, 6) and (3, 7) in Slot 2. Due to the numbers of RSs for antenna port 0 and antenna port 1 larger than those of RSs for antenna port 2 and antenna port 3, antenna pairing takes place in a different manner in Slot 1, that is, in the pattern of (0, 7) and (1, 6).

Referring to Pattern 1-4 illustrated in FIG. 14(*b*), the antennas are paired into (0, 6), (1, 7), (2, 4) and (3, 5) in Slot 2. However, since there are more RSs for antenna port 0 and antenna port 1 than for antenna port 2 and antenna port 3, antenna pairing takes place in a different manner in Slot 1, that is, in the pattern of (0, 5) and (1, 4).

To avoid interference between the RSs of paired antennas, orthogonality should be maintained between the RSs using a code/sequence. It is proposed as an example of CDM that an appropriate cyclic delay is applied in the time domain as described as Equation 14.

FIG. 15 illustrates CDM-multiplexing of some of the antenna pairs illustrated in FIG. 14(a).

Referring to FIG. 15(a), the RSs of antenna port 1, ($x_0$, $x_2$) and the RSs of antenna port 2, ($x_1$, $x_3$) are paired with the RSs of antenna port 6, respectively in Slot 1 and Slot 2 (slot 1: (1, 6), slot 2: (2, 6)). Thus antenna port 6 is paired with different antennas in Slot 1 and Slot 2. Although it seems that the frequency spacing between the RSs for antenna port 6 is 3, the frequency spacing is actually 6. Therefore, RS sequences for all antenna ports paired with antenna port 6 are multiplied by $e^{j\pi \cdot i}$ (i=0,1), that is, $[e^{j \cdot 0\pi} \; e^{j \cdot 1\pi}]$. In this manner, existing antennas are distinguished from added antennas by CDM.

Referring to FIG. 15(b), the RSs for antenna port 6 are represented as a cyclically shifted version of the RSs for antenna port 1 or antenna port 2 in the time domain. Because the CDM codes multiplied by the paired RSs cause a phase shift of UT in the frequency domain in FIG. 15(a), the RSs for antenna port 6 is cyclically shifted from the RSs for antenna port 1 or antenna port 2 by a half the period. Consequently, the RSs for an added antenna port, antenna port 6 are distinguishable from the RSs for an existing antenna port, antenna port 1 or antenna port 2. Since the RSs for antenna port 6 are apart from the RSs for antenna port 1 or antenna port 2 by 11.11/2 μs along the time axis, a short time delay of, for example, 5 to 6 μs may be covered.

Figure 16:
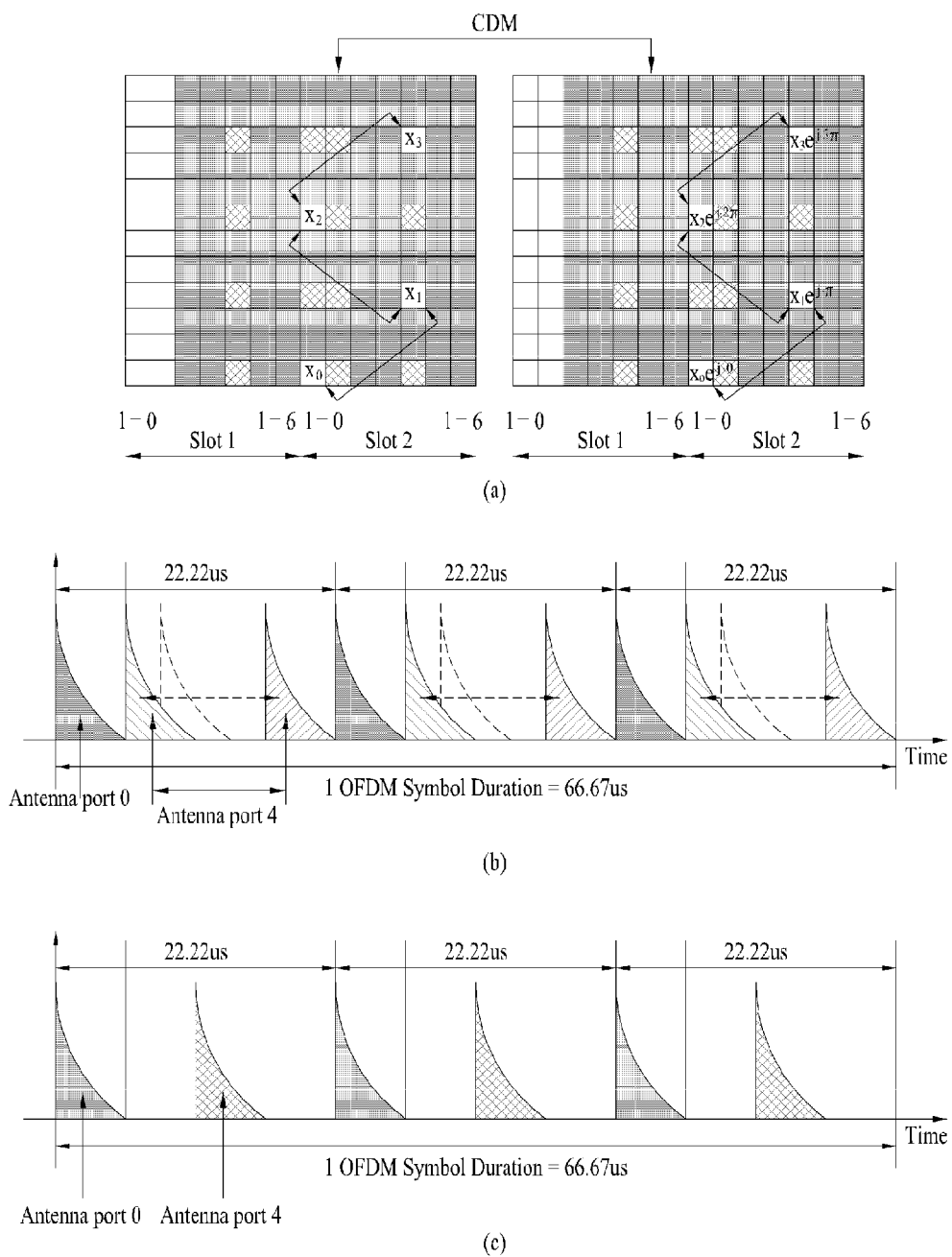
FIG. 16(a) illustrates an example of applying CDM to antenna pairing when RS frequency spacings are 3 and 6 according to an exemplary embodiment of the present invention.
FIG. 16(b) illustrates a time-domain representation of FIG. 16(a).
FIG. 16(c) illustrates another example of a time-domain representation of FIG. 16(a).

While the same CDM cyclic shift may be applied to every antenna pair as described above, different CDM cyclic shifts may be applied to different antenna pairs. FIG. 16 illustrates another exemplary CDM different from the CDM illustrated in FIG. 15.

In slot 2 illustrated in FIG. 14(a), antenna port 4 is paired with antenna port 0, expressed as (0, 4). The frequency spacing between the RSs for antenna port 0 is 3 due to staggering. Naturally, the RSs for antenna port 4 paired with antenna port 0 are apart from each other by a frequency spacing of 3. Therefore, the RS sequence for the paired antenna is multiplied by $e^{j\theta \cdot i}$ (i=0, 1, 2, 3) where θ determines a cyclic shift of an RS multiplied by a CDM code in the time domain. The time-domain cyclic shift is determined to be P×(θ+2π) in which P is the interval between RSs multiplied by a CDM code. Therefore, θ may be independently selected from among values that make an RS cyclic shift value equal to or larger than an allowed channel delay. For example, θ may satisfy π/2≦θ≦3π/2. In this case, an RS is cyclically shifted from its paired RS by one quarter or three quarters of the period. FIG. 16(b) illustrates a cyclic shift of the RSs for antenna port 4 within a predetermined range according to a change in θ. In this manner, an existing antenna may be distinguished from an added antenna in CDM by multiplying the RSs for an antenna pair with a frequency spacing of 3 by $[e^{j \cdot 0\theta} \; e^{j \cdot 1\theta} \; e^{j \cdot 2\theta} \; e^{j \cdot 3\theta}]$. Meanwhile, for a simple design of filters, the RS sequence for the paired antenna may be multiplied by $e^{j\pi \cdot i}$ (i=0, 1, 2, 3), which is illustrated in FIG. 16(c). Because θ is replaced with π, the RSs for the added antenna are cyclically shifted by a half period (11.11 μs).

Figure 17:
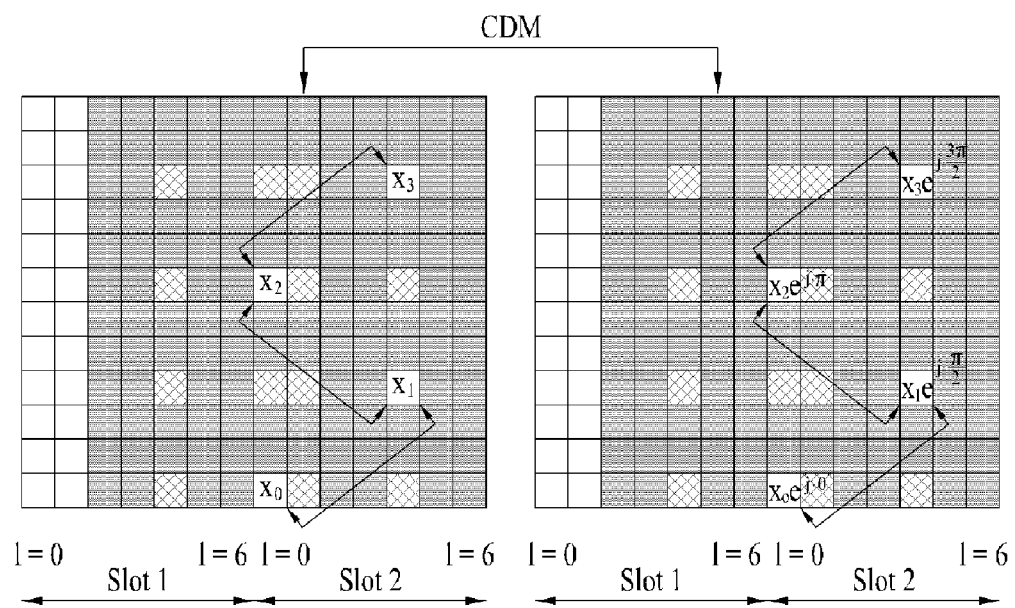
FIG. 17 illustrates an example of applying CDM to antenna pairing when a RS frequency spacing is 3 according to an exemplary embodiment of the present invention.

FIG. 17 illustrates an example of distinguishing antennas from each other by multiplying an RS sequence for a paired antenna by $$[e^{j\frac{0}{2}\pi} \; e^{j\frac{1}{2}\pi} \; e^{j\frac{2}{2}\pi} \; e^{j\frac{3}{2}\pi}]$$

when the frequency spacing between RSs is 3.

In Slot 2 illustrated in FIG. 14(a), antenna port 4 is paired with antenna port 0, represented as (0, 4). Their frequency spacing is 6 from the perspective of one OFDM symbol and 3 from the perspective of one slot.

If RSs are processed on an OFDM symbol basis, the RSs for antenna port 1 paired with antenna port 4 are ($x_0$, $x_2$) or ($x_1$, $x_3$) and multiplied by $$[e^{j\frac{0}{2}\pi} \; e^{j\frac{2}{2}\pi}]$$

or $$[e^{j\frac{1}{2}\pi} \; e^{j\frac{3}{2}\pi}].$$

The resulting RSs from the RSs ($x_0$, $x_2$) and ($x_1$, $x_3$) are ½-period cyclic shifts of the RSs ($x_0$, $x_2$) and ($x_1$, $x_3$). If the RSs are processed on a slot basis, the resulting RSs are the products between ($x_0$, $x_1$, $x_2$, $x_3$) and $$[e^{j\frac{0}{2}\pi} \; e^{j\frac{1}{2}\pi} \; e^{j\frac{2}{2}\pi} \; e^{j\frac{3}{2}\pi}]$$

and ¼-period cyclic shifts of ($x_0$, $x_1$, $x_2$, $x_3$).

B) Case of Long Channel Delay

It is proposed that the RS transmission scheme for the case of a short channel delay is applied to the case of a long channel delay. As stated before, the RS frequency spacing should be 3 to cover a long channel delay of, for example, 16.67 μs. However, there is a case of an RS frequency spacing of 6 in the methods proposed in "A) Case of Short Channel Delay".

Referring to FIGS. 14(a) and 14(b), antenna pairing is not accurately identical in Slot 1 and Slot 2. CDM is applied to some antennas with an RS frequency spacing of 6. Accordingly, it is proposed that the RSs for antenna port 0 to antenna port 3 are re-positioned so as to achieve a frequency spacing of 3 for the RSs of each antenna port, considering an environment experiencing a long channel delay.

FIGS. 18(a) and 18(b) illustrate examples of changing the positions of RSs for antenna ports such that the RSs for each antenna port are apart from each other by a frequency spacing of 3. Only a specific area to which CDM is applied (i.e. an area defined to be inaccessible to the LTE UE) is shown in FIGS. 18(a) and 18(b), in which the RSs for antenna port 0 to antenna port 7 are denoted by reference numerals 0 to 7.

The RS patterns illustrated in FIGS. 18(a) and 18(b) are tabulated as follows.

[Pattern 1-5]

| Subframe | Slot 1 | | | Slot 2 | | |
|---|---|---|---|---|---|---|
| | l = 0 | l = 1 | l = 3 or l = 4 | l = 0 | l = 1 | l = 3 or l = 4 |
| Antenna port 0 | 0, 6 | — | — | 0, 6 | — | 3, 9 |
| Antenna port 1 | 3, 9 | — | — | 3, 9 | — | 0, 6 |
| Antenna port 2 | — | 0, 6 | 0, 6 | — | 3, 9 | — |
| Antenna port 3 | — | 3, 9 | 3, 9 | — | 0, 6 | — |

[Pattern 1-5]

| Subframe | Slot 1 | | | Slot 2 | | |
|---|---|---|---|---|---|---|
| | l = 0 | l = 1 | l = 3 or l = 4 | l = 0 | l = 1 | l = 3 or l = 4 |
| CDM (Code Division Multiplexing) | | | | | | |
| Antenna port 4 | — | — | — | 0, 6 (0) | — | 3, 9 (0) |
| Antenna port 5 | — | — | — | 3, 9 (1) | — | 0, 6 (1) |
| Antenna port 6 | — | — | 0, 6 (2) | — | 3, 9 (2) | — |
| Antenna port 7 | — | — | 3, 9 (3) | — | 0, 6 (3) | — |

[Pattern 1-6]

| Subframe | Slot 1 | | | Slot 2 | | |
|---|---|---|---|---|---|---|
| | l = 0 | l = 1 | l = 3 or l = 4 | l = 0 | l = 1 | l = 3 or l = 4 |
| Antenna port 0 | 0, 6 | — | — | 0, 6 | — | 3, 9 |
| Antenna port 1 | 3, 9 | — | — | 3, 9 | — | 0, 6 |
| Antenna port 2 | — | 0, 6 | 0, 6 | — | 3, 9 | — |
| Antenna port 3 | — | 3, 9 | 3, 9 | — | 0, 6 | — |
| CDM (Code Division Multiplexing) | | | | | | |
| Antenna port 4 | — | — | 0, 6 (2) | — | 3, 9 (2) | — |
| Antenna port 5 | — | — | 3, 9 (3) | — | 0, 6 (3) | — |
| Antenna port 6 | — | — | — | 0, 6 (0) | — | 3, 9 (0) |
| Antenna port 7 | — | — | — | 3, 9 (1) | — | 0, 6 (1) |

In Pattern 1-5 and Pattern 1-6, l denotes the index of an OFDM symbol, the numerals in the tables denote subcarrier indexes within a resource block, - denotes non-RS allocation, and the numerals within the brackets denote paired antennas.

Antenna port 0 to antenna port 3 and antenna port 4 to antenna port 7 may be permuted independently and their RSs may be shifted along the frequency or time axis. The shift may be determined using a cell ID or the like.

As the RSs for antenna port 0 to antenna port 3 are repositioned as in Pattern 1-5 and Pattern 1-6, antenna port 0 to antenna port 3 are uniformly paired with antenna port 4 to 7 so that CDM may be applied through RS staggering. In Pattern 1-5, all antennas used in an MBSFN subframe are paired into (0, 4), (1, 5), (2, 6) and (3, 7) and then the RSs for each antenna pair are CDM-multiplexed. In the same manner, CDM may be considered for Pattern 1-6. Due to the change of the positions of the RSs for antenna port 0 to antenna port 3, the RS frequency spacing of the added antenna ports, antenna port 4 to antenna port 7 may be reduced to 3.

FIGS. 19 and 20 illustrate RSs observed in the time domain, when the RSs are allocated in Pattern 1-5.

Referring to FIG. 19, it is noted that the RSs for antenna port 6 are a cyclic shift of the RSs for antenna port 0 paired with antenna port 6 by 11.11 μs. Thus, when the channel delay spread exceeds 11.11 μs, interference may occur between the RSs of the antenna ports. However, since the signal strength of an RS decreases exponentially along the time axis, it is expected that the interference is not great. Meanwhile, in case of a long channel delay, it is required that a channel delay spread of up to 16.67 μs is covered. However, the channel delay spread of up to 16.67 μs is rarely seen in an environment using antenna port 0 to antenna port 7. Preferably, the above method is implemented in an environment in which a channel delay spread of 11.11 μs can be covered (see FIG. 20).

At present, an RS designed for channel measurement and an RS designed for data demodulation are under discussion in LTE-A. According to the present invention, RSs for newly added antennas to support LTE-A may be transmitted by CDM in an MBSFN subframe. The present invention is advantageous in that it applicable to both RSs serving the purposes of channel measurement and data demodulation.

Embodiment 2

Design of Dedicated RSs (DRSs) for 8Tx Antennas

The method for transmitting downlink RSs in an MBSFN subframe has a drawback that information about a radio channel can be transmitted to a UE only in an MBSFN subframe. Therefore, there exists a need for a method for transmitting downlink RSs for up to eight antennas in a normal subframe. An LTE-A UE will be able to use DRS positions defined in LTE for the RSs for antenna port 4 to antenna port 7. In this regard, another exemplary embodiment of the present invention provides a method for using DRSs transmitted in every subframe for a UE supporting five to eight antennas.

Figure 21:
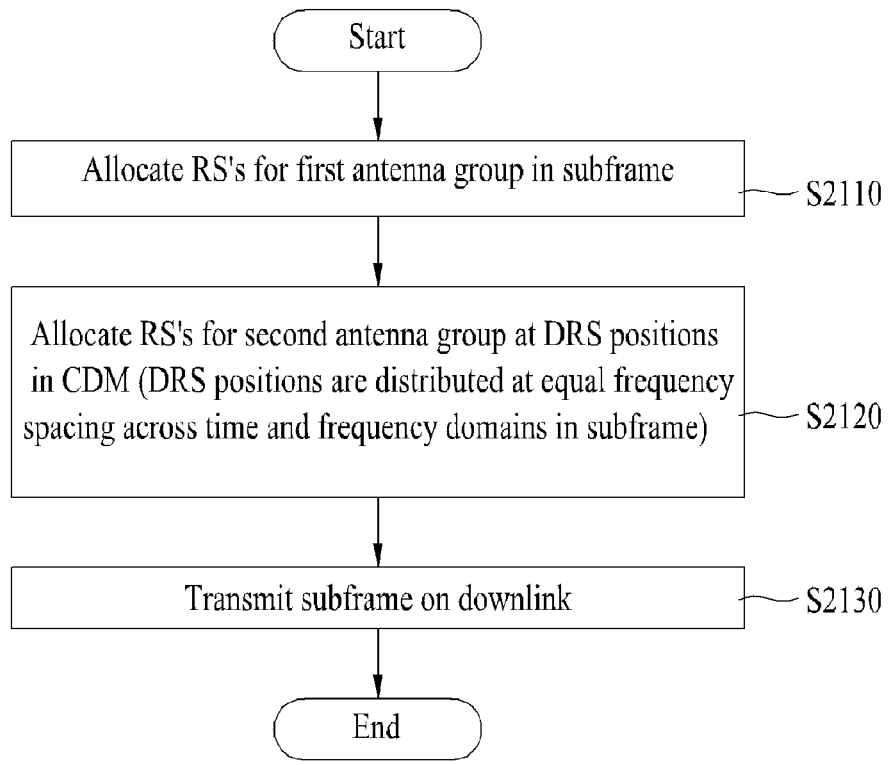
FIG. 21 is a flowchart illustrating a method for allocating RSs for antenna 4 to antenna 7 to Dedicated Reference Signal (DRS) positions in CDM according to an exemplary embodiment of the present invention.

FIG. 21 is a flowchart illustrating a method for allocating RSs for antenna port 4 to antenna port 7 to DRS positions by CDM according to an exemplary embodiment of the present invention.

Referring to FIG. 21, a BS allocates RSs for a first antenna group to a subframe in step S2110. The first antenna group includes existing antennas used in a conventional multi-antenna system. The conventional multi-antenna system may support antenna port 0 to antenna port 3. The conventional multi-antenna system may be an LTE system. For example, the first antenna group is comprised of only antenna port 0 to antenna port 3. The RSs for the first antenna group may be CRSs.

Subsequently, the BS allocates RSs for a second antenna group to predetermined positions defined for DRSs in the subframe by CDM in step S2120.

The BS may allocate the RSs for the first antenna group and the RSs for the second antenna group at the predetermined DRS positions by CDM.

The predetermined DRS positions may be distributed at an equal frequency spacing across the subframe in the time and frequency domains. The frequency spacing may be 3 or less in case of a normal CP and 1 in case of an extended CP. Also, the predetermined DRS positions have a frequency spacing of 2 or 3 within the same OFDM symbol. The second antenna group includes new antennas added to the conventional multi-antenna system. The second antenna group may include one to four antennas. A system to which the second antenna group is applied is a multi-antenna system supporting five to eight antennas. This system may be an LTE-A system. For example, the second antenna group includes antenna port 4 to antenna port 7.

In step S2130, the BS transmits the subframe carrying the RSs to a UE on a downlink.

The BS may transmit to the UE subframe identification information indicating that the subframe is intended for a specific UE supporting five to eight antennas. The subframe identification information may be delivered to the UE in System Information (SI), a Radio Resource Control (RRC) message, Layer 1/Layer 2 (L1/L2) control signaling (e.g. a Physical Downlink Control Channel (PDCCH)), a Medium Access Control/Radio Link Control/Packet Data Convergence Protocol (MAC/RLC/PDCP) Packet Data Unit (PDU), or the like. The RRC signal may be related to RRC connection release, RRC connection request, RRS connection setup, Radio Bearer (RB) setup, RB reconfiguration, RRC connection reconfiguration, and RRC connection re-establishment.

Figure 22:
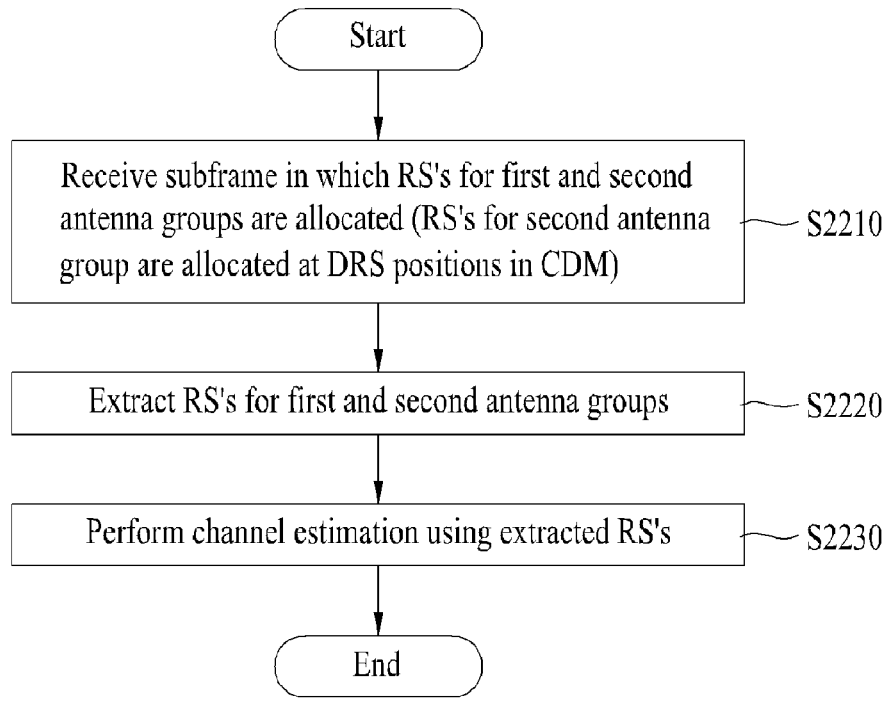
FIG. 22 is a flowchart illustrating a method for performing channel estimation in a UE, when RSs for five to eight Tx antennas are transmitted at DRS positions according to an exemplary embodiment of the present invention.

FIG. 22 is a flowchart illustrating a method for performing channel estimation in a UE when RSs for antenna port 4 to antenna port 7 are transmitted at DRS positions according to an exemplary embodiment of the present invention.

Referring to FIG. 22, the UE receives a subframe carrying RSs for first and second antenna groups in step S2210. The RSs for the second antenna group are allocated at predetermined positions defined for allocation of DRSs by CDM and the predetermined DRS positions are distributed at an equal frequency spacing across the time and frequency domains in the subframe. Or DRSs for the first antenna group and the RSs for the second antenna group may be allocated at the predetermined DRS positions in CDM.

In step S2220, the UE extracts the RSs for the first and second antenna groups from the subframe. The UE performs channel estimation using the extracted RSs in step S2230. The first antenna group and the second antenna group have been described before with reference to FIG. 21. Also, the UE may receive from the BS subframe identification information indicating that the subframe is for a specific UE supporting five to eight antennas.

Figure 23:
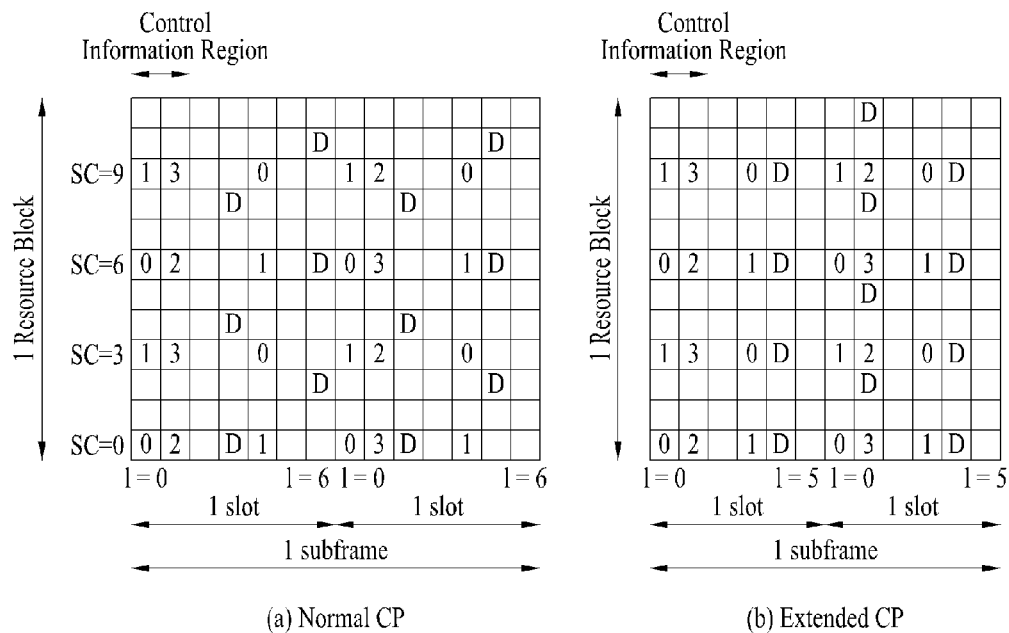
FIGS. 23(a) and 23(b) illustrate 3GPP LTE RS allocation structures for allocating demodulation RSs to a subframe using a normal CP and a subframe using an extended CP.

FIG. 23(a) illustrates a downlink subframe using a normal CP in the LTE system. RSs for antenna port 0 to antenna port 3 are denoted by reference numerals 0 to 3, respectively. The RSs for antenna 0 to antenna 3 are CRSs. Resource elements corresponding to DRS positions are denoted by reference character D, '1' denotes the index of an OFDM symbol, and 'SC' denotes the index of a subcarrier.

Referring to FIG. 23(a), the frequency spacing between DRSs is 2. Thus an RS allocated at a DRS position occurs twice in one symbol in the time domain. Given a symbol duration of 66.67 µs, a time resolution for enabling interpretation of an RS at a DRS position is 33.33 µs. When RSs for four more antennas added to the LTE-A system are allocated at a DRS position in CDM, each RS occupies 8.33 µs (=33.33/4). Considering that a channel delay of 5 to 6 µs is expected in case of a normal CP, the RSs for antenna port 4 to antenna port 7 may be transmitted at the DRS positions without interference. Also, it is possible to allocate DRSs such that the frequency spacing between DRSs is 1 or 2 in a subframe using a normal CP.

FIG. 23(b) illustrates a downlink subframe using an extended CP in the LTE system. RSs for antenna port 0 to antenna port 3 are denoted by reference numerals 0 to 3, respectively. The RSs for antenna 0 to antenna 3 are CRSs. Resource elements corresponding to DRS positions are denoted by reference character D, '1' denotes the index of an OFDM symbol, and 'SC' denotes the index of a subcarrier.

Referring to FIG. 23(b), the frequency spacing between DRSs is 3. Thus the same RS allocated at a DRS position occurs three times in one symbol in the time domain. Given a symbol duration of 66.67 µs, a time resolution for enabling interpretation of an RS at a DRS position is 22.22 µs. When RSs for four more antennas added to the LTE-A system are allocated to a DRS position in CDM, each RS occupies 5.55 µs (=22.22/4). Considering that a channel delay of about 15 µs is expected in case of an extended CP, CDM transmission of the RSs for antenna port 4 to antenna port 7 at the DRS position may cause interference among the RSs of the antennas. In other words, transmission of RSs for antenna port 4 to antenna port 7 at DRS positions in the LTE subframe using an extended CP may result in performance degradation.

In accordance with an exemplary embodiment of the present invention, 10 DRS patterns are proposed, which enable transmission of RSs for antenna port 4 to antenna 7 without performance degradation in an environment experiencing a long channel delay.

Figure 24:
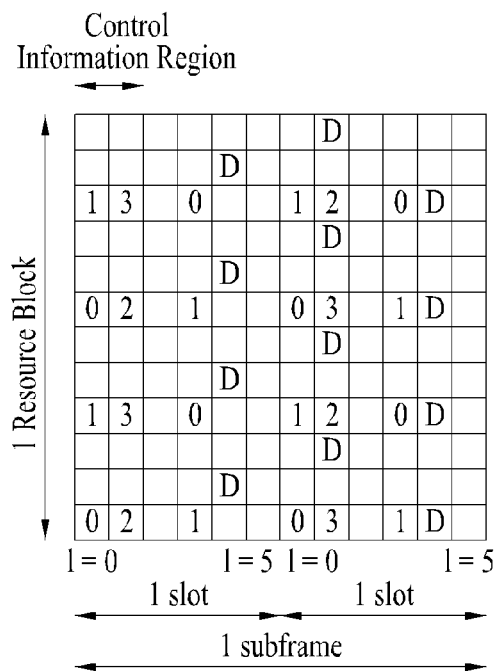
FIG. 24 illustrates an allocation of DRS positions in a subframe using an extended CP according to an exemplary embodiment of the present invention.

FIG. 24 illustrates an allocation of DRS positions in a subframe using an extended CP according to an exemplary embodiment of the present invention. The RS allocation pattern is given as Pattern 2-1.

[Pattern 2-1]

| Subframe | Slot 1 | | | | Slot 2 | | | |
|---|---|---|---|---|---|---|---|---|
| | l=0 | l=1 | l=3 | l=4 | l=0 | l=1 | l=3 | l=4 |
| Antenna port 0 | 0, 6 | — | 3, 9 | — | 0, 6 | — | 3, 9 | — |
| Antenna port 1 | 3, 9 | — | 0, 6 | — | 3, 9 | — | 0, 6 | — |
| Antenna port 2 | — | 0, 6 | — | — | — | 3, 9 | — | — |
| Antenna port 3 | — | 3, 9 | — | — | — | 0, 6 | — | — |
| DRS position | — | — | 1, 4, 7, 10 | — | 2, 5, 8, 11 | — | 0, 3, 6, 9 |
| Antenna port 4 | — | CDM (Code Division Multiplexing) at DRS position | | | | | | |
| Antenna port 5 | — | CDM (Code Division Multiplexing) at DRS position | | | | | | |
| Antenna port 6 | — | CDM (Code Division Multiplexing) at DRS position | | | | | | |
| Antenna port 7 | — | CDM (Code Division Multiplexing) at DRS position | | | | | | |

In Pattern 2-1, 1 denotes the index of an OFDM symbol, the numerals in the tables denote subcarrier indexes within a resource block, and - denotes non-RS allocation. The RSs may be shifted along the time or frequency axis.

Referring to Pattern 2-1, the frequency spacing between DRSs is maintained to be 3 within one OFDM symbol. It should be noted herein that DRSs stagger across three OFDM symbols to render the frequency spacing to be 1 within one subframe. Specifically, DRSs are allocated such that DRSs in OFDM symbol 4 (l=4) in Slot 1 do not overlap with DRSs in OFDM symbol 1 (l=1) and OFDM symbol 4 (l=4) in Slot 2 in terms of the frequency domain. In this case, the frequency spacing between DRSs may be ultimately 1. If RSs for antenna port 4 to antenna port 7 are allocated to the DRS positions in CDM, a time resolution for channel estimation based on an RS from each antenna is 16.67 µs (=66.66 µs/4). It is expected that a maximum channel delay spread is 15 µs in a radio environment experiencing a long channel delay. Because a longer time resolution than the maximum channel delay spread is ensured for each antenna, channel estimation may be carried out without performance degradation.

Figure 25:
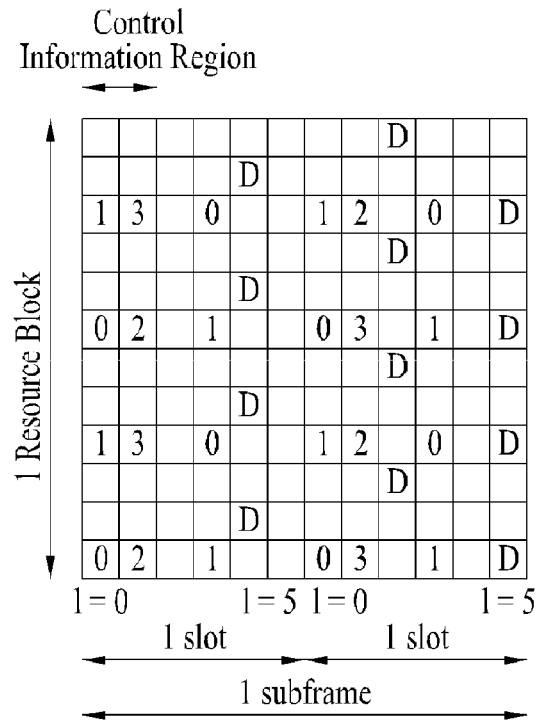
FIG. 25 illustrates an allocation of DRS positions in a subframe using an extended CP according to another exemplary embodiment of the present invention.

FIG. 25 illustrates an allocation of DRS positions in a subframe using an extended CP according to another exemplary embodiment of the present invention. The RS allocation pattern is given as Pattern 2-2.

[Pattern 2-2]

| Sub-frame | Slot 1 | | | | Slot 2 | | | | |
|---|---|---|---|---|---|---|---|---|---|
| | l = 0 | l = 1 | l = 3 | l = 4 | l = 0 | l = 1 | l = 2 | l = 3 | l = 5 |
| Antenna port 0 | 0, 6 | — | 3, 9 | — | 0, 6 | — | — | 3, 9 | — |
| Antenna port 1 | 3, 9 | — | 0, 6 | — | 3, 9 | — | — | 0, 6 | — |
| Antenna port 2 | — | 0, 6 | — | — | — | 3, 9 | — | — | — |
| Antenna port 3 | — | 3, 9 | — | — | — | 0, 6 | — | — | — |
| DRS position | — | — | 1, 4, 7, 10 | — | — | 2, 5, 8, 11 | — | — | 0, 3, 6, 9 |
| Antenna port 4 | — | CDM (Code Division Multiplexing) at DRS position | | | | | | | |
| Antenna port 5 | — | CDM (Code Division Multiplexing) at DRS position | | | | | | | |
| Antenna port 6 | — | CDM (Code Division Multiplexing) at DRS position | | | | | | | |
| Antenna port 7 | — | CDM (Code Division Multiplexing) at DRS position | | | | | | | |

In Pattern 2-2, '1' denotes the index of an OFDM symbol, the numerals in the tables denote subcarrier indexes within a resource block, and - denotes non-RS allocation. The RSs may be shifted along the time or frequency axis.

Referring to Pattern 2-2, DRSs are allocated basically in the same manner as in Pattern 2-1, except that DRSs are not disposed in OFDM symbols carrying CRSs for antenna port 0 to antenna port 3. In general, power may be boosted higher for RSs than for other resource elements to improve RS performance. If power is boosted for all RSs within a resource block, the power range that a power amplifier should support varies according to the number of RSs allocated to the same OFDM symbol. For example in Pattern 2-1, while four RSs are basically allocated to one OFDM symbol, OFDM symbol 1 (l=1) in Slot 2 carry eight RSs. Hence, a high power range should be designed to boost power for the eight RSs. When power boosting is performed only on four RSs as in the other OFDM symbols to maintain a total transmit power constant, the power of the other four RSs drops relatively, thereby degrading RS performance. In contrast, Pattern 2-2 does not cause this power problem because the same number of RSs is positioned in each OFDM symbol carrying RSs.

Figure 26:
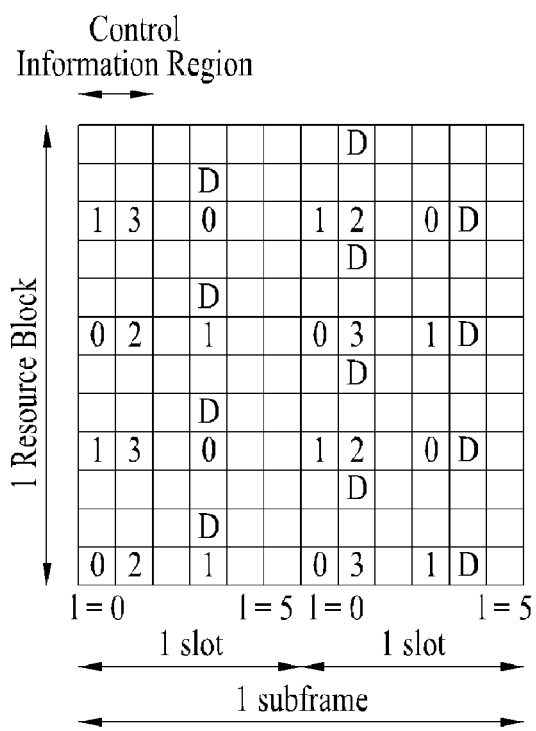
FIG. 26 illustrates an allocation of DRS positions in a subframe using an extended CP according to another exemplary embodiment of the present invention.

FIG. 26 illustrates an allocation of DRS positions in a subframe using an extended CP according to another exemplary embodiment of the present invention. The RS allocation pattern is given as Pattern 2-3.

[Pattern 2-3]

| Subframe | Slot 1 | | | Slot 2 | | | |
|---|---|---|---|---|---|---|---|
| | l = 0 | l = 1 | l = 3 | l = 0 | l = 1 | l = 3 | l = 4 |
| Antenna port 0 | 0, 6 | — | 3, 9 | 0, 6 | — | 3, 9 | — |
| Antenna port 1 | 3, 9 | — | 0, 6 | 3, 9 | — | 0, 6 | — |
| Antenna port 2 | — | 0, 6 | — | — | 3, 9 | — | — |
| Antenna port 3 | — | 3, 9 | — | — | 0, 6 | — | — |
| DRS position | — | 1, 4, 7, 10 | — | — | 2, 5, 8, 11 | — | 0, 3, 6, 9 |
| Antenna port 4 | — | CDM (Code Division Multiplexing) at DRS position | | | | | |

[Pattern 2-3] continued

| Subframe | Slot 1 | | | Slot 2 | | | |
|---|---|---|---|---|---|---|---|
| | l = 0 | l = 1 | l = 3 | l = 0 | l = 1 | l = 3 | l = 4 |
| Antenna port 5 | — | CDM (Code Division Multiplexing) at DRS position | | | | | |
| Antenna port 6 | — | CDM (Code Division Multiplexing) at DRS position | | | | | |
| Antenna port 7 | — | CDM (Code Division Multiplexing) at DRS position | | | | | |

In Pattern 2-3, l denotes the index of an OFDM symbol, the numerals in the tables denote subcarrier indexes within a resource block, and - denotes non-RS allocation. The RSs may be shifted along the time or frequency axis.

Referring to Pattern 2-3, DRSs are allocated basically in the same manner as in Pattern 2-1, except that DRSs are disposed as far as from one another in the time domain to maximize a time interpolation effect during channel estimation. Pattern 2-3 is characterized in that the last OFDM symbol (l=5 in Slot 2) carries no DRSs because it may deliver RSs for channel measurement, instead.

Figure 27:
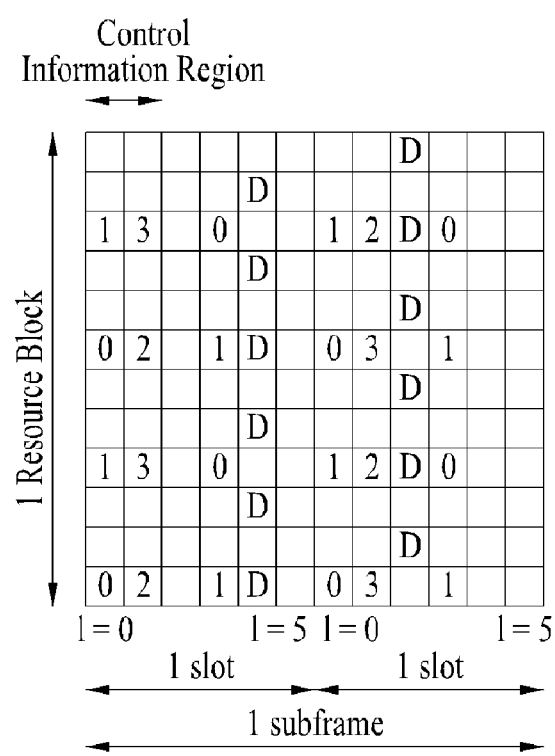
FIG. 27 illustrates an allocation of DRS positions in a subframe using an extended CP according to another exemplary embodiment of the present invention.

FIG. 27 illustrates an allocation of DRS positions in a subframe using an extended CP according to another exemplary embodiment of the present invention. The RS allocation pattern is given as Pattern 2-4.

[Pattern 2-4]

| Subframe | Slot 1 | | | | Slot 2 | | | |
|---|---|---|---|---|---|---|---|---|
| | l = 0 | l = 1 | l = 3 | l = 4 | l = 0 | l = 1 | l = 2 | l = 3 |
| Antenna port 0 | 0, 6 | — | 3, 9 | — | 0, 6 | — | — | 3, 9 |
| Antenna port 1 | 3, 9 | — | 0, 6 | — | 3, 9 | — | — | 0, 6 |
| Antenna port 2 | — | 0, 6 | — | — | — | 3, 9 | — | — |
| Antenna port 3 | — | 3, 9 | — | — | — | 0, 6 | — | — |
| DRS position | — | — | 0, 2, 4, 6, 8, 10 | — | — | 1, 3, 5, 7, 9, 11 | — | — |
| Antenna port 4 | — | CDM (Code Division Multiplexing) at DRS position | | | | | | |
| Antenna port 5 | — | CDM (Code Division Multiplexing) at DRS position | | | | | | |
| Antenna port 6 | — | CDM (Code Division Multiplexing) at DRS position | | | | | | |
| Antenna port 7 | — | CDM (Code Division Multiplexing) at DRS position | | | | | | |

In Pattern 2-4, '1' denotes the index of an OFDM symbol, the numerals in the tables denote subcarrier indexes within a resource block, and - denotes non-RS allocation. The RSs may be shifted along the time or frequency axis.

Referring to Pattern 2-4, the power problem described before with reference to Pattern 2-2 may be encountered with power boosting for RSs in the BS. Therefore, DRSs are allocated only in a single OFDM symbol in each slot. Notably, since the total number of OFDM symbols carrying DRSs is changed to 2, the frequency spacing between DRSs in each OFDM symbol carrying DRSs changes from 3 to 2. In this case, a final frequency spacing between DRSs is 1. As a consequence, channel estimation may be performed without performance degradation in spite of the extended CP. A feature of Pattern 2-4 lies in that channel estimation may be carried out using two OFDM symbols relatively close to each other in time. Because there is no need for performing channel estimation by collecting all RSs distributed across three OFDM symbols non-contiguous in the time domain, performance improvement may be expected in a high-speed environment where channels vary with time.

Figure 28:
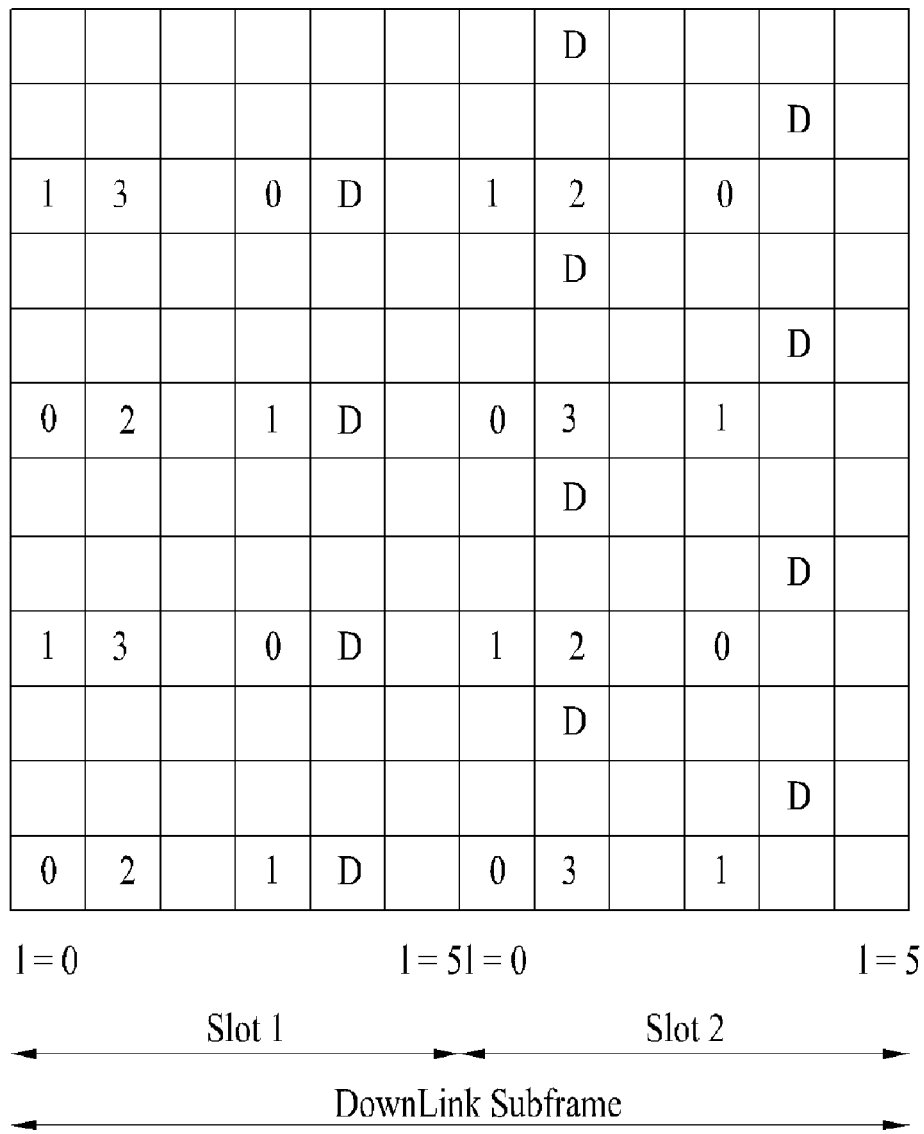
FIG. 28 illustrates an allocation of DRS positions in a subframe using an extended CP according to another exemplary embodiment of the present invention.

FIG. 28 illustrates an allocation of DRS positions in a subframe using an extended CP according to another exemplary embodiment of the present invention. The RS allocation pattern is given as Pattern 2-5.

[Pattern 2-5]

| Subframe | Slot 1 | | | | Slot 2 | | | |
|---|---|---|---|---|---|---|---|---|
| | l = 0 | l = 1 | l = 3 | l = 4 | l = 0 | l = 1 | l = 3 | l = 4 |
| Antenna port 0 | 0, 6 | — | 3, 9 | — | 0, 6 | — | 3, 9 | — |
| Antenna port 1 | 3, 9 | — | 0, 6 | — | 3, 9 | — | 0, 6 | — |
| Antenna port 2 | — | 0, 6 | — | — | — | 3, 9 | — | — |
| Antenna port 3 | — | 3, 9 | — | — | — | 0, 6 | — | — |
| DRS position | — | — | 0, 3, 6, 9 | — | 2, 5, 8, 11 | — | 1, 4, 7, 10 | |
| Antenna port 4 | — | CDM (Code Division Multiplexing) at DRS position | | | | | | |
| Antenna port 5 | — | CDM (Code Division Multiplexing) at DRS position | | | | | | |
| Antenna port 6 | — | CDM (Code Division Multiplexing) at DRS position | | | | | | |
| Antenna port 7 | — | CDM (Code Division Multiplexing) at DRS position | | | | | | |

In Pattern 2-5, 'l' denotes the index of an OFDM symbol, the numerals in the tables denote subcarrier indexes within a resource block, and - denotes non-RS allocation. The RSs may be shifted along the time or frequency axis.

Referring to Pattern 2-5, DRSs are allocated basically in the same manner as in Pattern 2-1, except that a pattern of staggering DRSs across OFDM symbols. To be more specific, DRSs are positioned at subcarriers 1, 4, 7 and 10 of OFDM symbol 4 (l=4) in Slot 1 and at subcarriers 0, 3, 6 and 9 of OFDM symbol 4 (l=4) in Slot 2 in Pattern 2-1, whereas DRSs are positioned at subcarriers 0, 3, 6 and 9 of OFDM symbol 4 (l=4) in Slot 1 and at subcarriers 1, 4, 7 and 10 of OFDM symbol 4 (l=4) in Slot 2 in Pattern 2-5.

Figure 29:
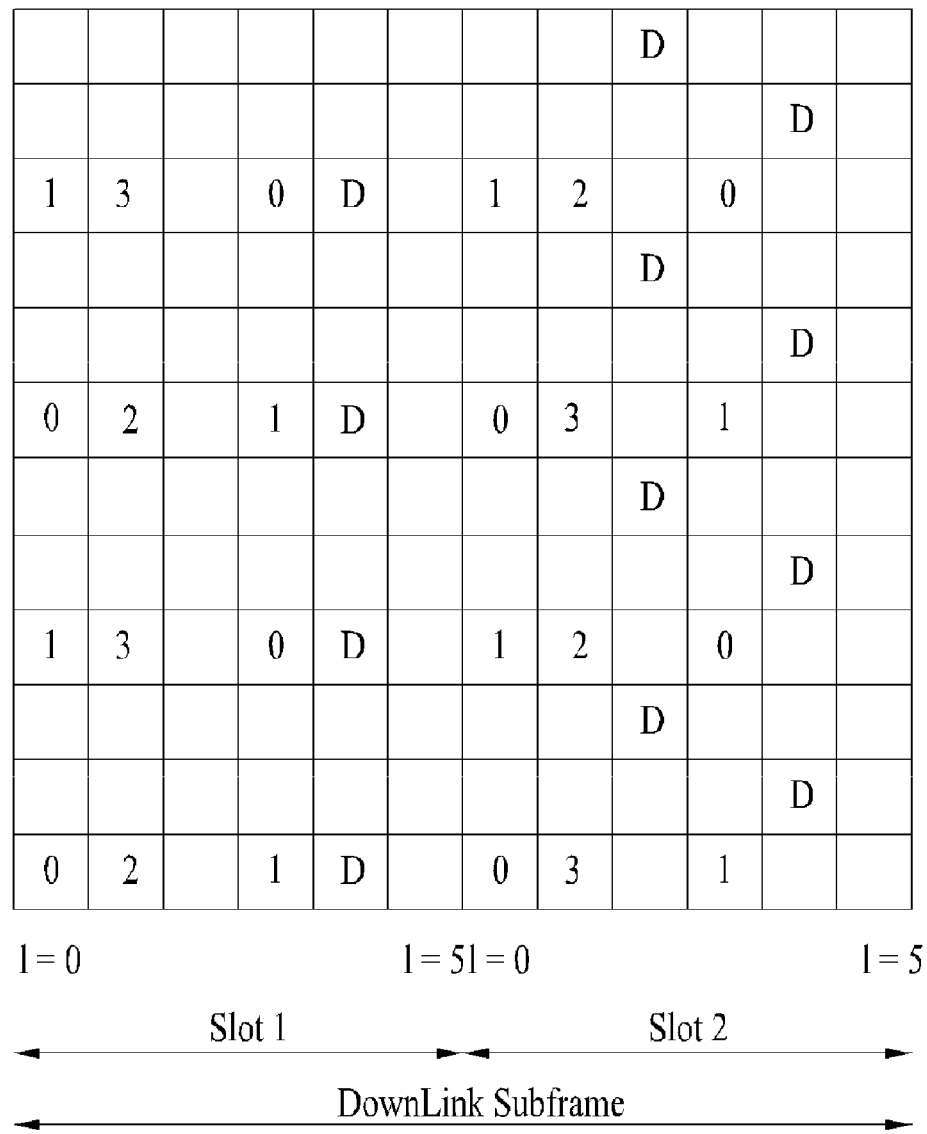
FIG. 29 illustrates an allocation of DRS positions in a subframe using an extended CP according to another exemplary embodiment of the present invention.

FIG. 29 illustrates an allocation of DRS positions in a subframe using an extended CP according to another exemplary embodiment of the present invention. The RS allocation pattern is given as Pattern 2-6.

[Pattern 2-6]

| Sub-frame | Slot 1 | | | | Slot 2 | | | | |
|---|---|---|---|---|---|---|---|---|---|
| | l = 0 | l = 1 | l = 3 | l = 4 | l = 0 | l = 1 | l = 2 | l = 3 | l = 4 |
| Antenna port 0 | 0, 6 | — | 3, 9 | — | 0, 6 | — | — | 3, 9 | — |
| Antenna port 1 | 3, 9 | — | 0, 6 | — | 3, 9 | — | — | 0, 6 | — |
| Antenna port 2 | — | 0, 6 | — | — | — | 3, 9 | — | — | — |
| Antenna port 3 | — | 3, 9 | — | — | — | 0, 6 | — | — | — |
| DRS position | — | — | 0, 3, 6, 9 | — | — | 2, 5, 8, 11 | — | 1, 4, 7, 10 | |
| Antenna port 4 | — | CDM (Code Division Multiplexing) at DRS position | | | | | | | |
| Antenna port 5 | — | CDM (Code Division Multiplexing) at DRS position | | | | | | | |
| Antenna port 6 | — | CDM (Code Division Multiplexing) at DRS position | | | | | | | |
| Antenna port 7 | — | CDM (Code Division Multiplexing) at DRS position | | | | | | | |

In Pattern 2-6, 'l' denotes the index of an OFDM symbol, the numerals in the tables denote subcarrier indexes within a resource block, and - denotes non-RS allocation. The RSs may be shifted along the time or frequency axis.

Referring to Pattern 2-6, DRSs are allocated basically in the same manner as in Pattern 2-5, except that no DRSs are disposed in OFDM symbols carrying CRSs for antenna port 0 antenna port 3 in Pattern 2-6 in order to avert the power problem described before with reference to Pattern 2-2.

Figure 30:
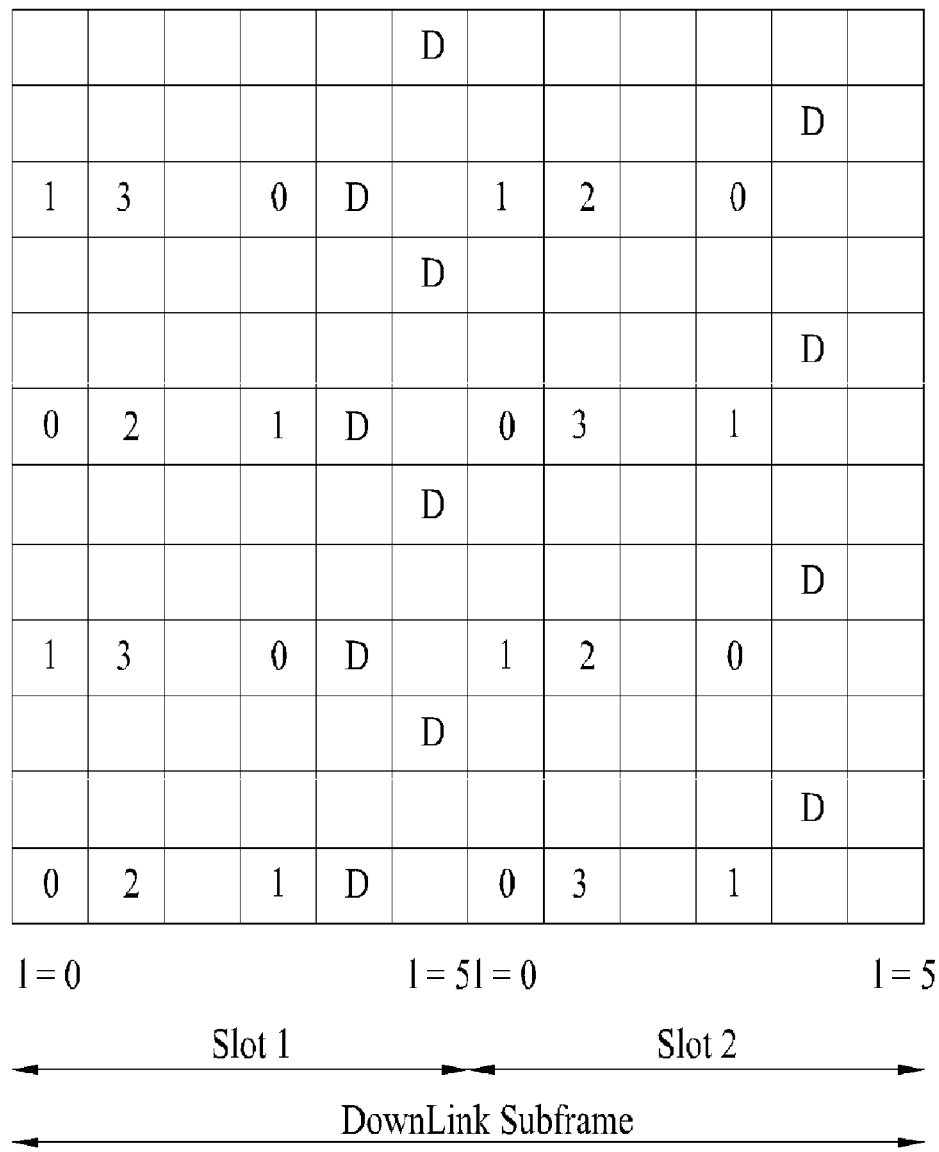
FIG. 30 illustrates an allocation of DRS positions in a subframe using an extended CP according to another exemplary embodiment of the present invention.

FIG. 30 illustrates an allocation of DRS positions in a subframe using an extended CP according to another exemplary embodiment of the present invention. The RS allocation pattern is given as Pattern 2-7.

[Pattern 2-7]

| Sub-frame | Slot 1 | | | | | Slot 2 | | | |
|---|---|---|---|---|---|---|---|---|---|
| | l = 0 | l = 1 | l = 3 | l = 4 | l = 5 | l = 0 | l = 1 | l = 3 | l = 4 |
| Antenna port 0 | 0, 6 | — | 3, 9 | — | — | 0, 6 | — | 3, 9 | — |
| Antenna port 1 | 3, 9 | — | 0, 6 | — | — | 3, 9 | — | 0, 6 | — |
| Antenna port 2 | — | 0, 6 | — | — | — | — | 3, 9 | — | — |
| Antenna port 3 | — | 3, 9 | — | — | — | — | 0, 6 | — | — |
| DRS position | — | — | — | 0, 3, 6, 9 | 2, 5, 8, 11 | — | — | — | 1, 4, 7, 10 |
| Antenna port 4 | — | CDM (Code Division Multiplexing) at DRS position | | | | | | | |
| Antenna port 5 | — | CDM (Code Division Multiplexing) at DRS position | | | | | | | |
| Antenna port 6 | — | CDM (Code Division Multiplexing) at DRS position | | | | | | | |
| Antenna port 7 | — | CDM (Code Division Multiplexing) at DRS position | | | | | | | |

In Pattern 2-7, 'l' denotes the index of an OFDM symbol, the numerals in the tables denote subcarrier indexes within a resource block, and - denotes non-RS allocation. The RSs may be shifted along the time or frequency axis.

Referring to Pattern 2-7, DRSs are allocated in different OFDM symbols from in Pattern 2-6.

Figure 31:
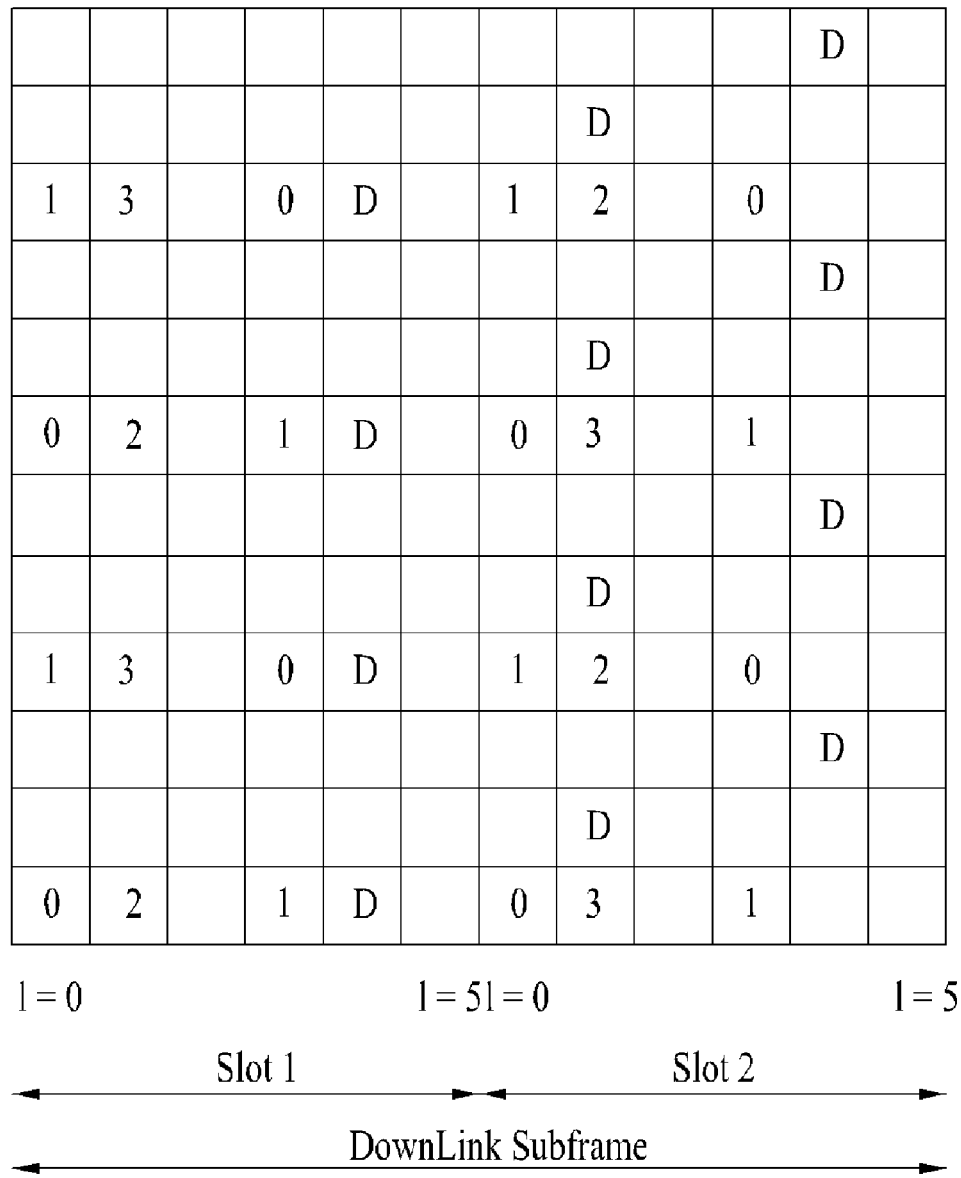
FIG. 31 illustrates an allocation of DRS positions in a subframe using an extended CP according to another exemplary embodiment of the present invention.

FIG. 31 illustrates an allocation of DRS positions in a subframe using an extended CP according to another exemplary embodiment of the present invention. The RS allocation pattern is given as Pattern 2-8.

[Pattern 2-8]

| Subframe | Slot 1 | | | | Slot 2 | | | |
|---|---|---|---|---|---|---|---|---|
| | l=0 | l=1 | l=3 | l=4 | l=0 | l=1 | l=3 | l=4 |
| Antenna port 0 | 0, 6 | — | 3, 9 | — | 0, 6 | — | 3, 9 | — |
| Antenna port 1 | 3, 9 | — | 0, 6 | — | 3, 9 | — | 0, 6 | — |
| Antenna port 2 | — | 0, 6 | — | — | — | 3, 9 | — | — |
| Antenna port 3 | — | 3, 9 | — | — | — | 0, 6 | — | — |
| DRS position | — | — | — | 0, 3, 6, 9 | — | 1, 4, 7, 10 | — | 2, 5, 8, 11 |
| Antenna port 4 | — | CDM (Code Division Multiplexing) at DRS position | | | | | | |
| Antenna port 5 | — | CDM (Code Division Multiplexing) at DRS position | | | | | | |
| Antenna port 6 | — | CDM (Code Division Multiplexing) at DRS position | | | | | | |
| Antenna port 7 | — | CDM (Code Division Multiplexing) at DRS position | | | | | | |

In Pattern 2-8, 'l' denotes the index of an OFDM symbol, the numerals in the tables denote subcarrier indexes within a resource block, and - denotes non-RS allocation. The RSs may be shifted along the time or frequency axis.

Referring to Pattern 2-8, DRSs are allocated basically in the same manner as in Pattern 2-1, except that a pattern of staggering DRSs across OFDM symbols. To be more specific, DRSs are positioned at subcarriers 1, 4, 7 and 10 of OFDM symbol 4 (l=4) in Slot 1, at subcarriers 2, 5, 8 and 11 of OFDM symbol 1 (l=1) in Slot 2, and at subcarriers 0, 3, 6, and 9 of OFDM symbol 4 (l=4) in Slot 2 in Pattern 2-1, whereas DRSs are positioned at subcarriers 0, 3, 6 and 9 of OFDM symbol 4 (l=4) in Slot 1, at subcarriers 1, 4, 7 and 10 of OFDM symbol 1 (l=1) in Slot 2, and at subcarriers 2, 5, 8 and 11 of OFDM symbol 4 (l=4) in Slot 2 in Pattern 2-8.

FIG. 32 illustrates an allocation of DRS positions in a subframe using an extended CP according to another exemplary embodiment of the present invention. The RS allocation pattern is given as Pattern 2-9.

[Pattern 2-9]

| Sub-frame | Slot 1 | | | | Slot 2 | | | | |
|---|---|---|---|---|---|---|---|---|---|
| | l=0 | l=1 | l=3 | l=4 | l=0 | l=1 | l=2 | l=3 | l=4 |
| Antenna port 0 | 0, 6 | — | 3, 9 | — | 0, 6 | — | — | 3, 9 | — |
| Antenna port 1 | 3, 9 | — | 0, 6 | — | 3, 9 | — | — | 0, 6 | — |
| Antenna port 2 | — | 0, 6 | — | — | — | — | 3, 9 | — | — |
| Antenna port 3 | — | 3, 9 | — | — | — | — | 0, 6 | — | — |
| DRS position | — | — | 0, 3, 6, 9 | — | — | 1, 4, 7, 10 | — | 2, 5, 8, 11 | — |
| Antenna port 4 | — | CDM (Code Division Multiplexing) at DRS position | | | | | | | |
| Antenna port 5 | — | CDM (Code Division Multiplexing) at DRS position | | | | | | | |
| Antenna port 6 | — | CDM (Code Division Multiplexing) at DRS position | | | | | | | |
| Antenna port 7 | — | CDM (Code Division Multiplexing) at DRS position | | | | | | | |

In Pattern 2-9, 'l' denotes the index of an OFDM symbol, the numerals in the tables denote subcarrier indexes within a resource block, and - denotes non-RS allocation. The RSs may be shifted along the time or frequency axis.

Referring to Pattern 2-9, DRSs are allocated basically in the same manner as in Pattern 2-8, except that no DRSs are disposed in OFDM symbols carrying CRSs for antenna port 0 antenna port 3 in Pattern 2-9 in order to avert the power problem described before with reference to Pattern 2-2.

Figure 33:
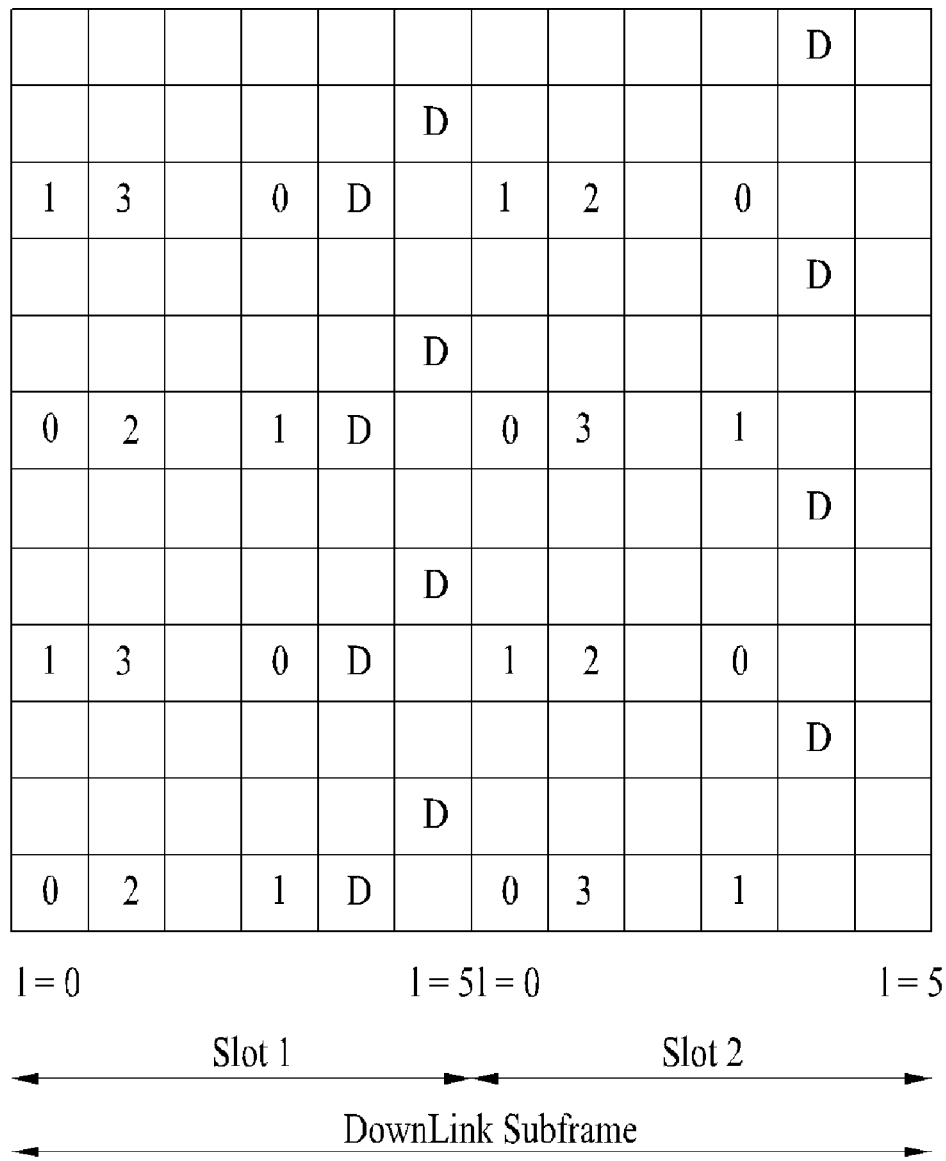
FIG. 33 illustrates an allocation of DRS positions in a subframe using an extended CP according to a further exemplary embodiment of the present invention.

FIG. 33 illustrates an allocation of DRS positions in a subframe using an extended CP according to a further exemplary embodiment of the present invention. The RS allocation pattern is given as Pattern 2-10.

[Pattern 2-10]

| Sub-frame | Slot 1 | | | | | Slot 2 | | | |
|---|---|---|---|---|---|---|---|---|---|
| | l=0 | l=1 | l=3 | l=4 | l=5 | l=0 | l=1 | l=3 | l=4 |
| Antenna port 0 | 0, 6 | — | 3, 9 | — | — | 0, 6 | — | 3, 9 | — |
| Antenna port 1 | 3, 9 | — | 0, 6 | — | — | 3, 9 | — | 0, 6 | — |
| Antenna port 2 | — | 0, 6 | — | — | — | — | 3, 9 | — | — |
| Antenna port 3 | — | 3, 9 | — | — | — | — | 0, 6 | — | — |
| DRS position | — | — | 0, 3, 6, 9 | 1, 4, 7, 10 | — | — | — | — | 2, 5, 8, 11 |
| Antenna port 4 | — | CDM (Code Division Multiplexing) at DRS position | | | | | | | |
| Antenna port 5 | — | CDM (Code Division Multiplexing) at DRS position | | | | | | | |
| Antenna port 6 | — | CDM (Code Division Multiplexing) at DRS position | | | | | | | |
| Antenna port 7 | — | CDM (Code Division Multiplexing) at DRS position | | | | | | | |

In Pattern 2-10, 'l' denotes the index of an OFDM symbol, the numerals in the tables denote subcarrier indexes within a resource block, and - denotes non-RS allocation. The RSs may be shifted along the time or frequency axis.

Referring to Pattern 2-10, DRSs are allocated in different OFDM symbols from in Pattern 2-9.

While it has been described that Pattern 2-1 to Pattern 2-10 describe the cases of allocating RSs for antenna port 4 to antenna port 7 to resource elements indicated by reference character D in CDM in FIGS. 24 to 33, the RSs for antenna port 4 to antenna port 7 may be allocated to the resource elements indicated by reference character D in CDM in FIGS. 24 to 33 in an environment experiencing a short channel delay spread.

MODE FOR INVENTION

Various embodiments have been described in the best mode for carrying out the invention.

INDUSTRIAL APPLICABILITY

The present invention is applicable to a method for conducting communication in a wireless communication system. More particularly, the present invention is applicable to a method for transmitting downlink RSs in a wireless communication system.

The exemplary embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in exemplary embodiments of the present invention may be rearranged. Some constructions of any one exemplary embodiment may be included in another exemplary embodiment and may be replaced with corresponding constructions of another exemplary embodiment. Also, it is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof.

In a hardware configuration, the methods for transmitting pilot allocation information according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Exemplary embodiments of the present invention have the following effects.

Downlink RSs can be transmitted efficiently in a multi-antenna wireless communication system.

In case of increasing multiple antennas in number, downlink RSs can be efficiently transmitted.

Also, downlink RSs can be transmitted with backward compatibility when multiple antennas are increased in number.

Downlink RSs can be efficiently transmitted in an environment where UEs with different capabilities coexist.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

What is claimed is:

1. A method for transmitting Reference Signals (RSs) via downlink communication in a multi-antenna wireless communication system, the method comprising:
    allocating RSs for a first antenna group to a subframe having a predetermined area with different access levels for User Equipments (UEs) having different access capabilities;
    pairing RSs for a second antenna group with RSs for the first antenna group; and
    allocating the paired RSs to the predetermined area of the subframe in Code Division Multiplexing (CDM); and
    transmitting the subframe via the downlink,
    wherein:
        allocating the RSs for the first antenna group comprises allocating the RSs in the predetermined area of the subframe in Pattern 1-1 or Pattern 1-2,
        Pattern 1-1 comprises:

|  | Slot 1 | | Slot 2 | |
| --- | --- | --- | --- | --- |
| Subframe | l = 3 or l = 4 | l = 0 | l = 1 | l = 3 or l = 4 |
| Antenna port 0 | 3, 9 | 0, 6 | — | 3, 9 |
| Antenna port 1 | 0, 6 | 3, 9 | — | 0, 6 |
| Antenna port 2 | — | — | 3, 9 | — |
| Antenna port 3 | — | — | 0, 6 | —; |

[Pattern 1-2] comprises:

|  | Slot 1 | | Slot 2 | |
| --- | --- | --- | --- | --- |
| Subframe | l = 3 or l = 4 | l = 0 | l = 1 | l = 3 or l = 4 |
| Antenna port 0 | — | 0, 6 | — | 3, 9 |
| Antenna port 1 | — | 3, 9 | — | 0, 6 |
| Antenna port 2 | 0, 6 | — | 3, 9 | — |
| Antenna port 3 | 3, 9 | — | 0, 6 | —; | l indicates an index of an Orthogonal Frequency Division Multiplexing (OFDM) symbol, numerals indicate subcarrier indexes within a resource block and — indicates non-RS allocation;
antenna port 0 to antenna port 3 may be permuted; and
RSs may be shifted along a frequency axis or a time axis.

2. The method according to claim 1, wherein the predetermined area is defined to be inaccessible to a UE supporting four or less antennas.

3. The method according to claim 1, wherein the subframe comprises a Multimedia Broadcast/multicast Single Frequency Network (MBSFN) subframe.

4. The method according to claim 1, wherein the RSs are Common Reference Signals (CRSs) or Dedicated Reference Signals (DRSs).

5. The method according to claim 1, wherein the second antenna group includes one to four antennas.

6. The method according to claim 1, wherein the number of RSs for each antenna included in the second antenna group is 4 or less.

7. The method according to claim 1, wherein a frequency spacing between RSs for each antenna included in the second antenna group is 3 or 6.

8. The method according to claim 1, wherein RSs for each antenna included in the second antenna group are cyclically delayed by a cyclic delay value that is selected independently from among values greater than or equal to an allowed channel delay.

9. The method according to claim 8, wherein the cyclic delay value is a quarter to three quarters of a period of RSs paired with the RSs for each antenna included in the second antenna group.

10. The method according to claim 9, wherein:
    the cyclic delay value is ¼, ½ or ¾ if the RSs for each antenna included in the second antenna group have a frequency spacing of 3; and the cyclic delay value is ½ if the RSs for each antenna included in the second antenna group have a frequency spacing of 6.

11. A method for transmitting Reference Signals (RSs) via downlink communication in a multi-antenna wireless communication system, the method comprising:
allocating RSs for a first antenna group to a subframe having a predetermined area with different access levels for User Equipments (UEs) having different access capabilities;
pairing RSs for a second antenna group with the RSs for the first antenna group and allocating the paired RSs to the predetermined area of the subframe in Code Division Multiplexing (CDM), if a rank is greater than or equal to a predetermined value; and
transmitting the subframe on the downlink,
wherein:
allocating the RSs for the first antenna group comprises allocating the RSs in the predetermined area of the subframe in Pattern 1-1 or Pattern 1-2,
Pattern 1-1 comprises:

|  | Slot 1 | | Slot 2 | |
| --- | --- | --- | --- | --- |
| Subframe | l = 3 or l = 4 | l = 0 | l = 1 | l = 3 or l = 4 |
| Antenna port 0 | 3, 9 | 0, 6 | — | 3, 9 |
| Antenna port 1 | 0, 6 | 3, 9 | — | 0, 6 |
| Antenna port 2 | — | — | 3, 9 | — |
| Antenna port 3 | — | — | 0, 6 | —; |

[Pattern 1-2] comprises:

|  | Slot 1 | Slot 2 | | |
| --- | --- | --- | --- | --- |
| Subframe | l = 3 or l = 4 | l = 0 | l = 1 | l = 3 or l = 4 |
| Antenna port 0 | — | 0, 6 | — | 3, 9 |
| Antenna port 1 | — | 3, 9 | — | 0, 6 |
| Antenna port 2 | 0, 6 | — | 3, 9 | — |
| Antenna port 3 | 3, 9 | — | 0, 6 | —; | l indicates an index of an Orthogonal Frequency Division Multiplexing (OFDM) symbol, numerals indicate subcarrier indexes within a resource block and — indicates non-RS allocation;
antenna port 0 to antenna port 3 may be permuted; and
RSs may be shifted along a frequency axis or a time axis.

12. The method according to claim 11, wherein the predetermined area is defined to be inaccessible to a UE supporting only four or less antennas.

13. The method according to claim 11, wherein the subframe comprises a Multimedia Broadcast/multicast Single Frequency Network (MBSFN) subframe.

14. The method according to claim 11, wherein the RSs are Common Reference Signals (CRSs) or Dedicated Reference Signals (DRSs).

15. The method according to claim 11, wherein the second antenna group includes one to four antennas.

16. The method according to claim 11, wherein the number of RSs for each antenna included in the second antenna group is 4 or less.

17. The method according to claim 11, wherein a frequency spacing between RSs for each antenna included in the second antenna group is 3 or 6.

18. The method according to claim 11, wherein RSs for each antenna included in the second antenna group are cyclically delayed by a cyclic delay value that is selected independently from among values greater than or equal to an allowed channel delay.

19. The method according to claim 18, wherein the cyclic delay value is a quarter to three quarters of a period of RSs paired with the RSs for each antenna included in the second antenna group.

20. The method according to claim 19, wherein:
the cyclic delay value is ¼, ½ or ¾ if the RSs for each antenna included in the second antenna group have a frequency spacing of 3; and
the cyclic delay value is ½ if the RSs for each antenna included in the second antenna group have a frequency spacing of 6.

21. A method for transmitting Reference Signals (RSs) via downlink communication in a multi-antenna wireless communication system, the method comprising:
allocating RSs for a first antenna group to a subframe having a predetermined area with different access levels for User Equipments (UEs) having different access capabilities;
pairing RSs for a second antenna group with RSs for the first antenna group; and
allocating the paired RSs to the predetermined area of the subframe in Code Division Multiplexing (CDM); and
transmitting the subframe via the downlink,
wherein:
the RSs for the first and second antenna groups are allocated in one of Pattern 1-3 to Pattern 1-6,
Pattern 1-3 comprises:

|  | Slot 1 | | | Slot 2 | | |
| --- | --- | --- | --- | --- | --- | --- |
| Subframe | l = 0 | l = 1 | l = 3 or l = 4 | l = 0 | l = 1 | l = 3 or l = 4 |
| Antenna port 0 | 0, 6 | — | 3, 9 | 0, 6 | — | 3, 9 |
| Antenna port 1 | 3, 9 | — | 0, 6 | 3, 9 | — | 0, 6 |
| Antenna port 2 | — | 0, 6 | — | — | 3, 9 | — |
| Antenna port 3 | — | 3, 9 | — | — | 0, 6 | — |
| CDM (Code Division Multiplexing) | | | | | | |
| Antenna port 4 | — | — | — | 0, 6 (0) | — | 3, 9 (0) |
| Antenna port 5 | — | — | — | 3, 9 (1) | — | 0, 6 (1) |
| Antenna port 6 | — | — | 0, 6 (1) | — | 3, 9 (2) | — |
| Antenna port 7 | — | — | 3, 9 (0) | — | 0, 6 (3) | —; |

Pattern 1-4 comprises:

|  | Slot 1 | | | Slot 2 | | |
| --- | --- | --- | --- | --- | --- | --- |
| Subframe | l = 0 | l = 1 | l = 3 or l = 4 | l = 0 | l = 1 | l = 3 or l = 4 |
| Antenna port 0 | 0, 6 | — | 3, 9 | 0, 6 | — | 3, 9 |
| Antenna port 1 | 3, 9 | — | 0, 6 | 3, 9 | — | 0, 6 |
| Antenna port 2 | — | 0, 6 | — | — | 3, 9 | — |
| Antenna port 3 | — | 3, 9 | — | — | 0, 6 | — |
| | | | CDM (Code Division Multiplexing) | | | |
| Antenna port 4 | — | — | 0, 6 (1) | — | 3, 9 (2) | — |
| Antenna port 5 | — | — | 3, 9 (0) | — | 0, 6 (3) | — |
| Antenna port 6 | — | — | — | 0, 6 (0) | — | 3, 9 (0) |
| Antenna port 7 | — | — | — | 3, 9 (1) | — | 0, 6 (1); |

Pattern 1-5 comprises:

|  | Slot 1 | | | Slot 2 | | |
| --- | --- | --- | --- | --- | --- | --- |
| Subframe | l = 0 | l = 1 | l = 3 or l = 4 | l = 0 | l = 1 | l = 3 or l = 4 |
| Antenna port 0 | 0, 6 | — | — | 0, 6 | — | 3, 9 |
| Antenna port 1 | 3, 9 | — | — | 3, 9 | — | 0, 6 |
| Antenna port 2 | — | 0, 6 | 0, 6 | — | 3, 9 | — |
| Antenna port 3 | — | 3, 9 | 3, 9 | — | 0, 6 | — |
| | | | CDM (Code Division Multiplexing) | | | |
| Antenna port 4 | — | — | — | 0, 6 (0) | — | 3, 9 (0) |
| Antenna port 5 | — | — | — | 3, 9 (1) | — | 0, 6 (1) |
| Antenna port 6 | — | — | 0, 6 (2) | — | 3, 9 (2) | — |
| Antenna port 7 | — | — | 3, 9 (3) | — | 0, 6 (3) | —; |

Pattern 1-6 comprises:

|  | Slot 1 | | | Slot 2 | | |
| --- | --- | --- | --- | --- | --- | --- |
| Subframe | l = 0 | l = 1 | l = 3 or l = 4 | l = 0 | l = 1 | l = 3 or l = 4 |
| Antenna port 0 | 0, 6 | — | — | 0, 6 | — | 3, 9 |
| Antenna port 1 | 3, 9 | — | — | 3, 9 | — | 0, 6 |
| Antenna port 2 | — | 0, 6 | 0, 6 | — | 3, 9 | — |
| Antenna port 3 | — | 3, 9 | 3, 9 | — | 0, 6 | — |
| | | | CDM (Code Division Multiplexing) | | | |
| Antenna port 4 | — | — | 0, 6 (2) | — | 3, 9 (2) | — |
| Antenna port 5 | — | — | 3, 9 (3) | — | 0, 6 (3) | — |
| Antenna port 6 | — | — | — | 0, 6 (0) | — | 3, 9 (0) |
| Antenna port 7 | — | — | — | 3, 9 (1) | — | 0, 6 (1); | l indicates an index of an OFDM symbol, numerals without parentheses indicate subcarrier indexes within a resource block, — denotes non-RS allocation and numerals within parentheses indicate paired antennas;

antenna port 0 to antenna port 3 and antenna port 4 to antenna port 7 may be permuted independently; and RSs may be shifted along a frequency axis or a time axis.

22. A method for performing channel estimation in a multi-antenna wireless communication system, the method comprising:

receiving a subframe in which Reference Signals (RSs) for first and second antenna groups are allocated;

extracting the RSs for the first and second antenna groups; and performing channel estimating using the extracted RSs, wherein:

the subframe includes a predetermined area with different access levels for User Equipments (UEs) having different access capabilities;

the RSs for the second antenna group are paired with RSs for the first antenna group and allocated to the predetermined area of the subframe in Code Division Multiplexing (CDM);

allocating the RSs for the first antenna group comprises allocating the RSs in the predetermined area of the subframe in Pattern 1-1 or Pattern 1-2;

Pattern 1-1 comprises:

|  | Slot 1 | Slot 2 | |
| --- | --- | --- | --- |
| Subframe | l = 3 or l = 4 | l = 0 | l = 1 | l = 3 or l = 4 |
| Antenna port 0 | 3, 9 | 0, 6 | — | 3, 9 |
| Antenna port 1 | 0, 6 | 3, 9 | — | 0, 6 |
| Antenna port 2 | — | — | 3, 9 | — |
| Antenna port 3 | — | — | 0, 6 | —; |

Pattern 1-2 comprises:

|  | Slot 1 | Slot 2 | |
| --- | --- | --- | --- |
| Subframe | l = 3 or l = 4 | l = 0 | l = 1 | l = 3 or l = 4 |
| Antenna port 0 | — | 0, 6 | — | 3, 9 |
| Antenna port 1 | — | 3, 9 | — | 0, 6 |
| Antenna port 2 | 0, 6 | — | 3, 9 | — |
| Antenna port 3 | 3, 9 | — | 0, 6 | —; | l indicates an index of an Orthogonal Frequency Division Multiplexing (OFDM) symbol, numerals indicate subcarrier indexes within a resource block and — indicates non-RS allocation;

antenna port 0 to antenna port 3 may be permuted; and

RSs may be shifted along a frequency axis or a time axis.

23. The method according to claim 22, wherein the predetermined area is defined to be inaccessible to a UE supporting four or less antennas.

24. The method according to claim 22, wherein the subframe is a Multimedia Broadcast/multicast Single Frequency Network (MBSFN) subframe.

25. The method according to claim 22, wherein the RSs are Common Reference Signals (CRSs) or Dedicated Reference Signals (DRSs).

26. The method according to claim 22, wherein the second antenna group includes one to four antennas.

27. The method according to claim 22, wherein the number of RSs for each antenna included in the second antenna group is 4 or less.

28. The method according to claim 22, wherein a frequency spacing between RSs for each antenna included in the second antenna group is 3 or 6.

29. The method according to claim 22, wherein:
RSs for each antenna included in the second antenna group are cyclically delayed by a cyclic delay value; and
the cyclic delay value is selected independently from among values greater than or equal to an allowed channel delay.

30. The method according to claim 29, wherein the cyclic delay value is a quarter to three quarters of a period of RSs paired with the RSs for each antenna included in the second antenna group.

31. The method according to claim 30, wherein:
the cyclic delay value is ¼, ½ or ¾ if the RSs for each antenna included in the second antenna group have a frequency spacing of 3; and
the cyclic delay value is ½ if the RSs for each antenna included in the second antenna group have a frequency spacing of 6.

32. A method for performing channel estimation in a multi-antenna wireless communication system, the method comprising:
receiving a subframe in which Reference Signals (RSs) for first and second antenna groups are allocated;
extracting the RSs for the first and second antenna groups; and
performing channel estimating using the extracted RSs,
wherein:
the subframe includes a predetermined area with different access levels for User Equipments (UEs) having different access capabilities;
the RSs for the second antenna group are paired with RSs for the first antenna group and allocated to the predetermined area of the subframe in Code Division Multiplexing (CDM), if a rank is greater than or equal to predetermined value;
allocating the RSs for the first antenna group comprises allocating the RSs in the predetermined area of the subframe in Pattern 1-1 or Pattern 1-2;
Pattern 1-1 comprises:

|  | Slot 1 | Slot 2 | | |
|---|---|---|---|---|
| Subframe | l = 3 or l = 4 | l = 0 | l = 1 | l = 3 or l = 4 |
| Antenna port 0 | 3, 9 | 0, 6 | — | 3, 9 |
| Antenna port 1 | 0, 6 | 3, 9 | — | 0, 6 |
| Antenna port 2 | — | — | 3, 9 | — |
| Antenna port 3 | — | — | 0, 6 | —; |

Pattern 1-2 comprises:

|  | Slot 1 | Slot 2 | | |
|---|---|---|---|---|
| Subframe | l = 3 or l = 4 | l = 0 | l = 1 | l = 3 or l = 4 |
| Antenna port 0 | — | 0, 6 | — | 3, 9 |
| Antenna port 1 | — | 3, 9 | — | 0, 6 |
| Antenna port 2 | 0, 6 | — | 3, 9 | — |
| Antenna port 3 | 3, 9 | — | 0, 6 | —; | l indicates an index of an Orthogonal Frequency Division Multiplexing (OFDM) symbol, numerals indicate subcarrier indexes within a resource block and — indicates non-RS allocation;
antenna port 0 to antenna port 3 may be permuted; and
RSs may be shifted along a frequency axis or a time axis.

33. The method according to claim 32, wherein the predetermined area is defined to be inaccessible to a UE supporting four or less antennas.

34. The method according to claim 32, wherein the subframe is a Multimedia Broadcast/multicast Single Frequency Network (MBSFN) subframe.

35. The method according to claim 32, wherein the RSs are Common Reference Signals (CRSs) or Dedicated Reference Signals (DRSs).

36. The method according to claim 32, wherein the second antenna group includes one to four antennas.

37. The method according to claim 32, wherein the number of RSs for each antenna included in the second antenna group is 4 or less.

38. The method according to claim 32, wherein a frequency spacing between RSs for each antenna included in the second antenna group is 3 or 6.

39. The method according to claim 32, wherein:
RSs for each antenna included in the second antenna group are cyclically delayed by a cyclic delay value; and
the cyclic delay value is selected independently from among values greater than or equal to an allowed channel delay.

40. The method according to claim 39, wherein the cyclic delay value is a quarter to three quarters of a period of RSs paired with the RSs for each antenna included in the second antenna group.

41. The method according to claim 40, wherein:
the cyclic delay value is ¼, ½ or ¾ if the RSs for each antenna included in the second antenna group have a frequency spacing of 3; and
the cyclic delay value is ½ if the RSs for each antenna included in the second antenna group have a frequency spacing of 6.

42. A method for performing channel estimation in a multi-antenna wireless communication system, the method comprising:
receiving a subframe in which Reference Signals (RSs) for first and second antenna groups are allocated;
extracting the RSs for the first and second antenna groups; and
performing channel estimating using the extracted RSs,
wherein:
the subframe includes a predetermined area with different access levels for User Equipments (UEs) having different access capabilities;
the RSs for the second antenna group are paired with RSs for the first antenna group and allocated to the predetermined area of the subframe in Code Division Multiplexing (CDM);

the RSs for the first and second antenna groups are allocated in one of the following patterns, Pattern 1-3 to Pattern 1-6;

Pattern 1-3 comprises:

| | Slot 1 | | | Slot 2 | | |
|---|---|---|---|---|---|---|
| Subframe | l = 0 | l = 1 | l = 3 or l = 4 | l = 0 | l = 1 | l = 3 or l = 4 |
| Antenna port 0 | 0, 6 | — | 3, 9 | 0, 6 | — | 3, 9 |
| Antenna port 1 | 3, 9 | — | 0, 6 | 3, 9 | — | 0, 6 |
| Antenna port 2 | — | 0, 6 | — | — | 3, 9 | — |
| Antenna port 3 | — | 3, 9 | — | — | 0, 6 | — |
| CDM (Code Division Multiplexing) | | | | | | |
| Antenna port 4 | — | — | — | 0, 6 (0) | — | 3, 9 (0) |
| Antenna port 5 | — | — | — | 3, 9 (1) | — | 0, 6 (1) |
| Antenna port 6 | — | — | 0, 6 (1) | — | 3, 9 (2) | — |
| Antenna port 7 | — | — | 3, 9 (0) | — | 0, 6 (3) | —; |

Pattern 1-4 comprises:

| | Slot 1 | | | Slot 2 | | |
|---|---|---|---|---|---|---|
| Subframe | l = 0 | l = 1 | l = 3 or l = 4 | l = 0 | l = 1 | l = 3 or l = 4 |
| Antenna port 0 | 0, 6 | — | 3, 9 | 0, 6 | — | 3, 9 |
| Antenna port 1 | 3, 9 | — | 0, 6 | 3, 9 | — | 0, 6 |
| Antenna port 2 | — | 0, 6 | — | — | 3, 9 | — |
| Antenna port 3 | — | 3, 9 | — | — | 0, 6 | — |
| (Code Division Multiplexing) | | | | | | |
| Antenna port 4 | — | — | 0, 6 (1) | — | 3, 9 (2) | — |
| Antenna port 5 | — | — | 3, 9 (0) | — | 0, 6 (3) | — |
| Antenna port 6 | — | — | — | 0, 6 (0) | — | 3, 9 (0) |
| Antenna port 7 | — | — | — | 3, 9 (1) | — | 0, 6 (1); |

Pattern 1-5 comprises:

| | Slot 1 | | | Slot 2 | | |
|---|---|---|---|---|---|---|
| Subframe | l = 0 | l = 1 | l = 3 or l = 4 | l = 0 | l = 1 | l = 3 or l = 4 |
| Antenna port 0 | 0, 6 | — | — | 0, 6 | — | 3, 9 |
| Antenna port 1 | 3, 9 | — | — | 3, 9 | — | 0, 6 |
| Antenna port 2 | — | 0, 6 | 0, 6 | — | 3, 9 | — |
| Antenna port 3 | — | 3, 9 | 3, 9 | — | 0, 6 | — |
| CDM (Code Division Multiplexing) | | | | | | |
| Antenna port 4 | — | — | — | 0, 6 (0) | — | 3, 9 (0) |
| Antenna port 5 | — | — | — | 3, 9 (1) | — | 0, 6 (1) |
| Antenna port 6 | — | — | 0, 6 (2) | — | 3, 9 (2) | — |
| Antenna port 7 | — | — | 3, 9 (3) | — | 0, 6 (3) | —; |

Pattern 1-6 comprises:

| | Slot 1 | | | Slot 2 | | |
|---|---|---|---|---|---|---|
| Subframe | l = 0 | l = 1 | l = 3 or l = 4 | l = 0 | l = 1 | l = 3 or l = 4 |
| Antenna port 0 | 0, 6 | — | — | 0, 6 | — | 3, 9 |
| Antenna port 1 | 3, 9 | — | — | 3, 9 | — | 0, 6 |
| Antenna port 2 | — | 0, 6 | 0, 6 | — | 3, 9 | — |
| Antenna port 3 | — | 3, 9 | 3, 9 | — | 0, 6 | — |
| CDM (Code Division Multiplexing) | | | | | | |
| Antenna port 4 | — | — | 0, 6 (2) | — | 3, 9 (2) | — |
| Antenna port 5 | — | — | 3, 9 (3) | — | 0, 6 (3) | — |
| Antenna port 6 | — | — | — | 0, 6 (0) | — | 3, 9 (0) |
| Antenna port 7 | — | — | — | 3, 9 (1) | — | 0, 6 (1); |

I indicates an index of an OFDM symbol, numerals without parentheses indicate subcarrier indexes within a resource block, — indicates non-RS allocation and numerals within parentheses indicate paired antennas;

wherein antenna port 0 to antenna port 3 and antenna port 4 to antenna port 7 may be permuted independently; and the RSs may be shifted along a frequency axis or a time axis.

* * * * *